(12) United States Patent
Tamura et al.

(10) Patent No.: US 9,260,110 B2
(45) Date of Patent: Feb. 16, 2016

(54) CONTROL DEVICE OF VEHICLE POWER TRANSMISSION DEVICE

(75) Inventors: Takemi Tamura, Kariya (JP); Hideto Watanabe, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 574 days.

(21) Appl. No.: 13/582,140

(22) PCT Filed: Mar. 1, 2010

(86) PCT No.: PCT/JP2010/053272
§ 371 (c)(1),
(2), (4) Date: Nov. 6, 2012

(87) PCT Pub. No.: WO2011/108066
PCT Pub. Date: Sep. 9, 2011

(65) Prior Publication Data
US 2013/0054064 A1    Feb. 28, 2013

(51) Int. Cl.
*B60W 10/06*    (2006.01)
*B60W 10/08*    (2006.01)
(Continued)

(52) U.S. Cl.
CPC .......... *B60W 20/1084* (2013.01); *B60W 10/06* (2013.01); *B60W 10/08* (2013.01); *B60W 30/20* (2013.01); *B60K 6/445* (2013.01); *B60L 2240/423* (2013.01); *B60W 20/00* (2013.01); *B60W 2510/083* (2013.01); *B60W 2510/1065* (2013.01); *B60W 2710/083* (2013.01);
(Continued)

(58) Field of Classification Search
CPC .......................... B60W 10/08; B60W 20/1084

USPC .................................... 701/22, 51, 67, 68, 99
See application file for complete search history.

(56) References Cited

U.S. PATENT DOCUMENTS 6,067,801 A * 5/2000 Harada et al. ................. 903/903
6,247,437 B1 * 6/2001 Yamaguchi et al. .......... 903/903
(Continued)

FOREIGN PATENT DOCUMENTS

JP   2001-164960   6/2001
JP   2004-254434   9/2004
(Continued)

OTHER PUBLICATIONS

Teratani et al, Vehicle and its control method, Espacenet machine translation of JP2005204360A, Jul. 28, 2005.*
(Continued)

*Primary Examiner* — Tuan C. To
*Assistant Examiner* — Dale W Hilgendorf
(74) *Attorney, Agent, or Firm* — Finnegan, Henderson, Farabow, Garrett & Dunner, LLP

(57) ABSTRACT

It is provided a control device of a hybrid type vehicle power transmission device having a prime mover and an electric motor each coupled to a drive shaft in a power transmittable manner, including: a slow change processing means, when any of a torque of the drive shaft, a torque of the prime mover, and a torque of the electric motor changes and passes through zero, slowly changing the torque at a change rate set in advance for suppressing gear rattling noise; and a torque compensating means, if the slow change processing means slowly changes the torque of one of the prime mover and the electric motor, compensating a shortage of the torque of the drive shaft occurring due to the slow change with the other torque not slowly changed.

3 Claims, 13 Drawing Sheets

(51) Int. Cl.
*B60W 20/00* (2006.01)
*B60W 30/20* (2006.01)
*B60K 6/445* (2007.10)

(52) U.S. Cl.
CPC .......... *Y02T10/6239* (2013.01); *Y02T 10/6286* (2013.01); *Y02T 10/642* (2013.01)

(56) References Cited

U.S. PATENT DOCUMENTS

| | | | |
|---|---|---|---|
| 7,165,470 B2 * | 1/2007 | Sakamoto | B60W 10/08 74/339 |
| 7,577,507 B2 * | 8/2009 | Morris | B60W 10/08 701/22 |
| 7,846,060 B2 * | 12/2010 | Kanayama | B60W 10/08 477/159 |
| 7,974,747 B2 * | 7/2011 | Muta | 701/22 |
| 2007/0256871 A1 * | 11/2007 | Kaneko et al. | 903/945 |
| 2008/0004780 A1 * | 1/2008 | Watanabe et al. | 903/917 |

FOREIGN PATENT DOCUMENTS

| | | |
|---|---|---|
| JP | 2005-204360 | 7/2005 |
| JP | 2005204360 A * | 7/2005 |
| JP | 2005-061278 | 10/2005 |
| JP | 2006-257894 | 9/2006 |
| JP | 2008-6945 | 1/2008 |
| JP | 2009-298266 | 12/2009 |

OTHER PUBLICATIONS

International Search Report in International Application No. PCT/JP2010/053272; Mailing Date: Apr. 20, 2010.

* cited by examiner

CONTROL DEVICE OF VEHICLE POWER TRANSMISSION DEVICE

CROSS-REFERENCE TO RELATED APPLICATIONS

This application is a national phase application of International Application No. PCT/JP2010/053272, filed Mar. 1, 2010, the content of which is incorporated herein by reference.

TECHNICAL FIELD

The present invention relates to a control device of a hybrid type vehicle power transmission device and particularly to reduction of gear rattling noise generated depending on a change in running state.

BACKGROUND ART

A hybrid type vehicle power transmission device is known that includes a prime mover and an electric motor to realize an optimum running state depending on a vehicle state by distributing the power of the prime mover to the electric motor and an output shaft, by combining the powers of the prime mover and the electric motor, or by driving the electric motor while the prime mover is stopped. For example, a vehicle of Patent Document 1 is an example thereof. The vehicle of Patent Document 1 includes an engine, a power distribution integrating mechanism consisting of a planetary gear mechanism coupled to the engine in a power transmittable manner, a motor coupled to a predetermined rotating element of the power distribution integrating mechanism in a power transmittable manner, and a motor coupled via a reduction gear to a drive shaft of the power distribution integrating mechanism. Patent Document 1 discloses a technique of implementing a so-called slow change process in which, while a drive torque is changed toward a drive force request value calculated based on accelerator pedal operation etc., of a driver, if the drive torque is associated with a change of sign (i.e., the drive force passes through zero), a change in the drive torque is slowed when the drive torque passes through zero. This enables the suppression of gear rattling noise generated because a backlash of a gear is closed in the opposite direction when the drive torque is positively/negatively reversed.

PRIOR ART DOCUMENT

Patent Document

Patent Document 1: Japanese Laid-Open Patent Publication No. 2005-204360

SUMMARY OF THE INVENTION

Problem to be Solved by the Invention

Although the vehicle of Patent Document 1 executes a slow change process of slowing down a change in drive torque when a drive torque (drive force) of a drive shaft (such as a propeller shaft) of the vehicle is positively/negatively reversed, the slow change process is not executed when a torque of an electric motor is positively/negatively reversed during a running state in which the drive torque is not positively/negatively reversed. Hybrid type vehicles including that of Patent Document 1 use at least one electric motor and make the switch between power running and regeneration as needed depending on a running state on the conditions such as a vehicle speed and a shift position of vehicle and, even if the drive torque is not positively/negatively reversed, the running state may occur that causes the positive/negative reversal of the torque (drive force) of the electric motor. In such a case, even the vehicle of Patent Document 1 may cause gear rattling noise from a gear etc., coupled to the electric motor in a power transmittable manner when the torque of the electric motor is positively/negatively reversed.

The present invention was conceived in view of the situations and it is therefore an object of the present invention to provide a control device of a vehicle power transmission device capable of effectively suppressing gear rattling noise generated during running in a hybrid type vehicle power transmission device having a prime mover and an electric motor connected to a drive shaft in a power transmittable manner.

Means for Solving the Problems

To achieve the object, the first aspect of the present invention provides a control device of a hybrid type vehicle power transmission device (a) having a prime mover and an electric motor each coupled to a drive shaft in a power transmittable manner, comprising: (b) a slow change processing means, when any of a torque of the drive shaft, a torque of the prime mover, and a torque of the electric motor changes and passes through zero, slowly changing the torque at a change rate set in advance for suppressing gear rattling noise; and (c) a torque compensating means, if the slow change processing means slowly changes the torque of one of the prime mover and the electric motor, compensating a shortage of the torque of the drive shaft occurring due to the slow change with the other torque not slowly changed.

The Effects of the Invention

Consequently, when any torque of the drive shaft, the prime mover and the electric motor passes through zero, the torque is slowly changed at a preset change rate suppressing gear rattling noise, thereby preferably suppressing the gear rattling noise generated when the torque passes through zero. If a torque of one of the prime mover and the electric motor is slowly changed, the shortage of the torque of the drive shaft occurring in association with the slow change is compensated by a torque of the other not slowly changed, thereby solving the torque shortage of the output shaft due to the slow change and suppressing the effect on running performance.

Preferably, the prime mover is a first electric motor coupled in a power transmittable manner to a rotating element of a differential mechanism having an input shaft coupled to an engine, wherein the electric motor is a second electric motor coupled in a power transmittable manner to an output shaft of the differential mechanism, and wherein the torque compensating means is implemented while the engine is in operation.

Consequently, when the torque of the first electric motor passes through zero, the torque is slowly changed at a change rate suppressing the gear rattling noise, thereby preferably suppressing the gear rattling noise. In this case, since the shortage of the torque of the drive shaft is compensated with the torque of the second electric motor, the effect of the slow change of the torque of the first electric motor on running performance is suppressed. When the torque of the second electric motor passes through zero, the torque is slowly changed at a change rate suppressing the gear rattling noise, thereby preferably suppressing the gear rattling noise. In this case, since the shortage of the torque of the drive shaft is compensated with the torque of the first electric motor, the effect of the slow change of the torque of the second electric motor on running performance is suppressed. While the engine is stopped, since the first electric motor is in an idle state and the torque of the first electric motor is zero, the torque of the first electric motor does not pass through zero and the compensation of the torque with the first electric motor is impossible. Therefore, while the engine is in operation, the torque compensating means can preferably be implemented.

Preferably, if it is determined that the torques of both the first electric motor and the second electric motor change and pass through zero during the torque control of the drive shaft, the slow change processing means makes an adjustment such that the timing of slowly changing the torque of the first electric motor does not overlap the timing of slowly changing the torque of the second electric motor.

Consequently, if it is determined that the torques of both the first electric motor and the second electric motor change and pass through zero during the torque control, the adjustment is made such that the timing of slowly changing the torque of the first electric motor and the timing of slowly changing the torque of the second electric motor are not overlapped with each other and, therefore, the torque compensation by the second electric motor is enabled when the torque of the first electric motor is slowly changed while the torque compensation by the first electric motor is enabled when the torque of the second electric motor is slowly changed.

Preferably, a change rate of the torque at the time of execution of the slow change processing means is set based on a preset two-dimensional map configured with an absolute value of the torque and a change rate of the torque. Consequently, a preferably change rate of torque can be set based on the two-dimensional map and the gear rattling noise can preferably be suppressed.

Preferably, a change rate of the torque at the time of execution of the slow change processing means is a given preset value suppressing the gear rattling noise. Consequently, when the torque passes through zero, the change rate of torque is set to the predetermined value suppressing the gear rattling noise, and the gear rattling noise can preferably be suppressed.

MODES FOR CARRYING OUT THE INVENTION

Embodiments of the present invention will now be described in detail with reference to the drawings. In the following embodiments, the figures are simplified or deformed as needed and are not necessarily accurately drawn in terms of dimensional ratios, shapes, etc., of portions.

First Embodiment

Figure 1:
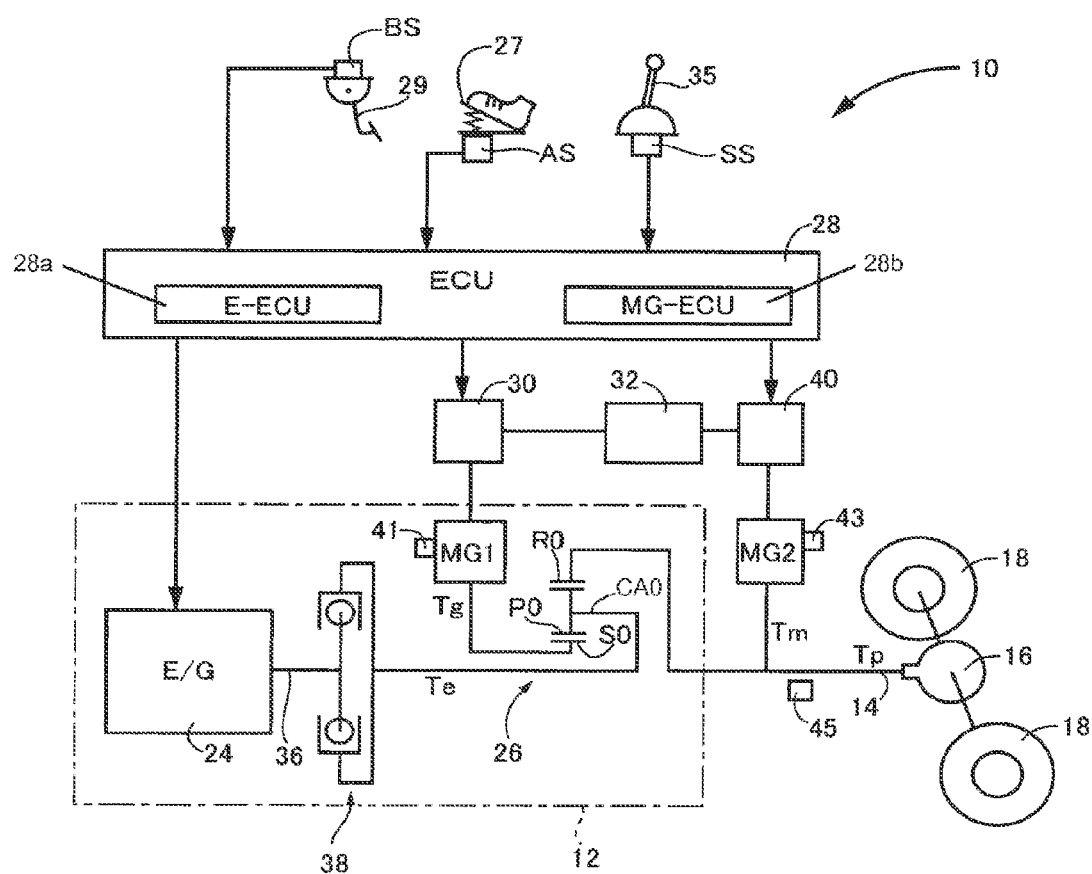
FIG. 1 is a diagram of a general configuration for explaining a hybrid type vehicle power transmission device to which the present invention is applied.

FIG. 1 is a diagram of a general configuration for explaining a hybrid type vehicle power transmission device 10 (hereinafter referred to as a power transmission device 10) to which the present invention is applied. In FIG. 1, the power transmission device 10 transmits a torque of a first drive power source 12, i.e., a main drive source, to a wheel-side output shaft (hereinafter referred to as the output shaft) 14 acting as an output member in a vehicle and the torque is transmitted from the output shaft 14 (corresponding to a drive shaft of the present invention) via a differential gear device 16 to a pair of left and right drive wheels 18. The power transmission device 10 has a second electric motor MG2 capable of selectively providing power running control for outputting a drive force for running and regenerative control for recovering energy as a second drive power source and the second electric motor MG2 is coupled to the output shaft 14 in a power transmittable manner.

The first drive power source 12 is mainly made up of an engine 24 acting as a main power source, a first electric motor MG1 (corresponding to a prime mover of the present invention), and a planetary gear device 26 acting as a power distribution mechanism (differential mechanism) for combining or distributing torque between the engine 24 and the first electric motor MG1 (differential electric motor). The engine 24 is a known internal combustion engine combusting fuel to output power, such as a gasoline engine and a diesel engine, and is configured to have an operation state, such as a throttle valve opening degree and an intake air amount, a fuel supply amount, and ignition timing, electrically controlled by an engine-control electronic control unit (E-ECU) 28a mainly made up of a microcomputer.

The first electric motor MG1 (differential electric motor) is, for example, a synchronous electric motor, configured to selectively fulfill a function as an electric motor generating a drive torque and a function as an electric generator, and connected via an inverter 30 to an electric storage device 32 such as a battery and a capacitor. A motor-generator-control electronic control unit (MG-ECU) 28b mainly made up of a microcomputer controls the inverter 30 to adjust or set the drive torque or the regenerative torque of the first electric motor MG1.

The planetary gear device 26 (differential mechanism) is a single pinion type planetary gear mechanism that includes a sun gear S0, a ring gear R0 disposed concentrically to the sun gear S0, and a carrier CA0 supporting a pinion gear P0 engaging with the sun gear S0 and the ring gear R0 in a rotatable and revolvable manner as three rotating elements to generate a known differential action. The planetary gear device 26 is disposed concentrically to the engine 24. Since the planetary gear device 26 is symmetrically configured relative to a center line, the lower half thereof is not depicted in FIG. 1.

In this embodiment, a crankshaft 36 of the engine 24 also acts as an input shaft of the differential mechanism and is coupled via a damper 38 to the carrier CA0 of the planetary gear device 26. On the other hand, the sun gear S0 is coupled to the first electric motor MG1, and the ring gear R0 is coupled to the output shaft 14. As a result, the carrier CA0 acts as an input element; the sun gear S0 acts as a reaction force element; and the ring gear R0 acts as an output element.

Figure 2:
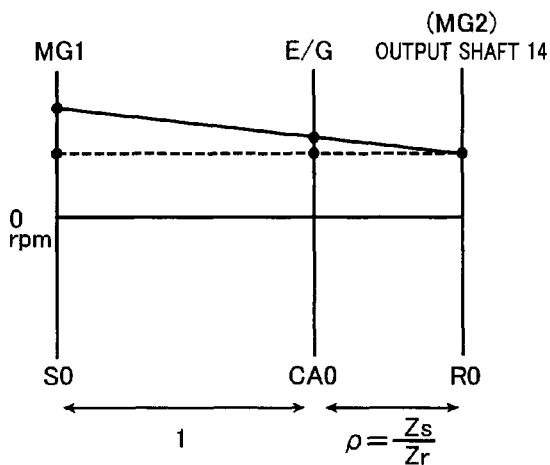
FIG. 2 is a collinear diagram for depicting relative relationship among rotation speeds of the rotating elements in the planetary gear device acting as a power distribution mechanism.

A collinear diagram of FIG. 2 depicts relative relationship among rotation speeds of the rotating elements in the single pinion type planetary gear device 26 acting as a differential mechanism. In this collinear diagram, a vertical axis S0, a vertical axis CA0, and a vertical axis R0 are axes representative of a rotation speed of the sun gear S0, a rotation speed of the carrier CA0, and a rotation speed of the ring gear R0, respectively, and mutual intervals between the vertical axis S0, the vertical axis CA0, and the vertical axis R0 are set such that an interval between the vertical axis CA0 and the vertical axis R0 is $\rho$ (teeth number Zs of the sun gear S0/teeth number Zr of the ring gear R0) when an interval between the vertical axis S0 and the vertical axis CA0 is set to one.

If a reaction torque from the first electric motor MG1 is input to the sun gear S0 for an output torque of the engine 24 input to the carrier CA0 in the planetary gear device 26, a direct torque occurs in the ring gear R0 that is the output element and, therefore, the first electric motor MG1 acts as an electric generator. When the rotation speed of the ring gear R0, i.e., the rotation speed of the output shaft 14 (output shaft rotation speed) is constant, a rotation speed (engine rotation speed) of the engine 24 can be changed continuously (in a stepless manner) by changing a rotation speed Nmg1 of the first electric motor MG1 higher and lower. A broken line of FIG. 2 indicates a reduced state of the engine rotation speed when the rotation speed Nmg1 of the first electric motor MG1 is lowered from a value indicated by a solid line. Therefore, for example, the control of setting the engine rotation speed to a rotation speed for the optimum fuel consumption can be provided by controlling the first electric motor MG1. This kind of hybrid type is referred to as a mechanical distribution or split type. As described above, a differential state of the planetary gear device 26 is electrically controlled by the first electric motor MG1.

The second electric motor MG2 (corresponding to an electric motor of the present invention) acting as a second drive power source is controlled via an inverter 40 by the motor-generator-control electronic control unit (MG-ECU) 28b and is driven to act as an electric motor or an electric generator and the assist output torque or the regenerative torque is adjusted or set.

The electronic control unit 28 includes, for example, the engine-control electronic control unit (E-ECU) 28a for controlling the engine 24 and the MG-control electronic control unit (MG-ECU) 28b for controlling the first electric motor MG1 and the second electric motor MG2. The electronic control unit 28 is supplied with a signal indicative of the first electric motor rotation speed Nmg1 from a first rotation speed sensor 41; a signal indicative of a second electric motor rotation speed Nmg2 from a second rotation speed sensor 43; a signal indicative of the output shaft rotation speed of the output shaft 14 corresponding to the vehicle speed from a third rotation speed sensor 45; a signal indicative of an operation position of a shift lever 35 from an operation position sensor SS; a signal indicative of an operation amount of an accelerator pedal 27 from an accelerator operation amount sensor AS; and a signal indicative of the presence of operation of a brake pedal 29 from a brake sensor BS. Additionally, the electronic control unit 28 is supplied from sensors etc., not depicted with a signal indicative of a charging current or discharging current (hereinafter referred to as charging/discharging current or input/output current) of the electric storage device 32; a signal indicative of a voltage of the electric storage device 32; a signal indicative of a charge capacity (state of charge) SOC of the electric storage device 32; a signal indicative of a first electric motor torque Tg (corresponding to a torque of the prime mover of the present invention) of the first electric motor MG1 based on a supply electric power (supply current) of the inverter 30; and a signal indicative of a second electric motor torque Tm (corresponding to a torque of the electric motor of the present invention) of the second electric motor MG2 based on a supply electric power (supply current) of the inverter 40. The engine-control electronic control unit (E-ECU) 28a and the MG-control electronic control unit (MG-ECU) 28b are not necessarily separately formed and may integrally be formed.

Figure 3:
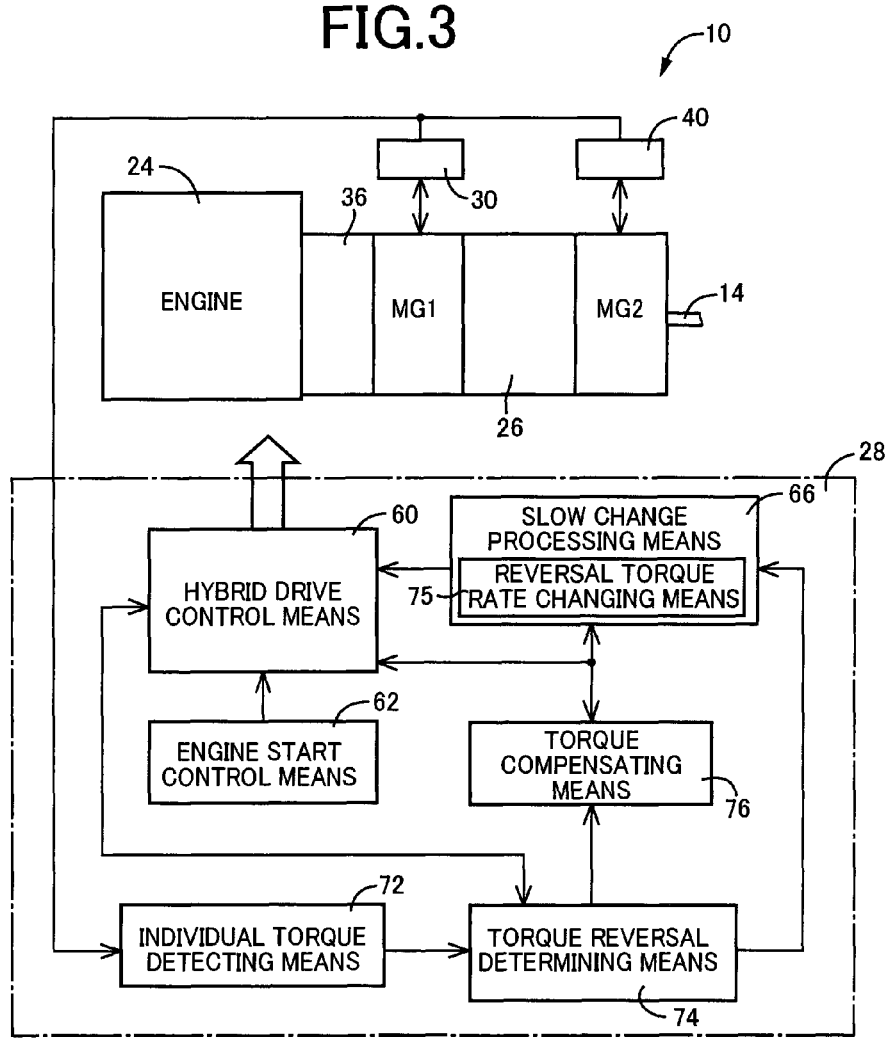
FIG. 3 is a functional block diagram for explaining a main portion of the control function of the electronic control unit.

FIG. 3 is a functional block diagram for explaining a main portion of the control function of the electronic control unit 28. In FIG. 3, for example, after a key is inserted into a key slot, when a power switch is operated to activate the control while a brake pedal is operated, a hybrid drive control means 60 calculates a requested output of a driver based on an accelerator operation amount and drives at least one of the engine 24 and the second electric motor MG2 to generate the requested drive force such that the operation is achieved with lower fuel consumption and a smaller exhaust gas amount. For example, the hybrid drive control means 60 switches a motor running mode using only the second electric motor MG2 as a drive source with the engine 24 stopped, a charging running mode using the second electric motor MG2 as a drive source while the first electric motor MG1 generates electric power from the power of the engine 24, an engine running mode mechanically transmitting the power of the engine 24 to the drive wheels 18 for running, etc., depending on a running state.

The hybrid drive control means 60 controls the engine rotation speed through the first electric motor MG1 such that the engine 24 operates on the optimal fuel consumption curve. During coasting (regenerative running), the second electric motor MG2 is rotationally driven by inertia energy of a vehicle to regenerate electric power, which is stored in the electric storage device 32.

Reverse running is achieved by rotationally driving the second electric motor MG2 in a reverse direction. In this case, the first electric motor MG1 of the first drive power source 12 is caused to idle and the output shaft 14 is allowed to rotate in reverse regardless of the operation state of the engine 24.

More Specifically describing the control in the engine running mode as an example, the hybrid drive control means 60 drives the engine 24 to operate in an efficient operation range while controlling the drive force distribution between the engine 24 and the second electric motor MG2 and the reaction force due to the electric generation by the first electric motor MG1 to achieve the optimum state for the sake of power performance, fuel consumption improvement, etc.

For example, the hybrid drive control means 60 determines a requested output shaft torque Tp* (corresponding to a requested drive torque) output to the output shaft 14 from a drive force map stored in advance based on an accelerator operation amount (accelerator opening degree Acc) as an output request amount of a driver, a vehicle speed V, etc., calculates a requested output shaft power from the requested output shaft torque Tp* in consideration of a charge request value etc., calculates a target engine power so as to acquire the requested output shaft power in consideration of a transmission loss, loads of accessories, an assist torque of the second electric motor MG2, etc., and controls the engine 24 as well as an amount of the electric generation of the first electric motor MG1 to achieve the engine rotation speed and an engine torque Te at which the target engine power is acquired while operating the engine 24 along the optimal fuel consumption curve (fuel consumption map, relationship) of the engine empirically obtained and stored in advance so as to satisfy both the drivability and the fuel consumption property in the two-dimensional coordinates made up of the engine rotation speed and the engine torque Te, for example.

Since the hybrid drive control means 60 supplies the electric energy generated by the first electric motor MG1 via the inverters 30, 40 to the electric storage device 32 and the second electric motor MG2, a main portion of the power of the engine 24 is mechanically transmitted to the output shaft 14 while a portion of the power of the engine 24 is consumed for the electric generation of the first electric motor MG1 and converted into electric energy, and the electric energy is supplied via the inverters 30, 40 to the second electric motor MG2 to drive the second electric motor MG2 and is transmitted from the second electric motor MG2 to the output shaft 14. The devices related to the electric energy from the generation to the consumption by the second electric motor MG2 make up an electric path from the conversion of a portion of the power of the engine 24 into electric energy to the conversion of the electric energy into mechanical energy. The hybrid drive control means 60 can directly supply electric energy from the electric storage device 32 via the inverter 40 to the second electric motor MG2 to drive the second electric motor MG2 in addition to the electric energy through the electric path.

The hybrid drive control means 60 can control the first electric motor MG1 with the differential action of the planetary gear device 26 to maintain or control the engine rotation speed substantially constant or at an arbitrary rotation speed regardless of whether a vehicle is stopped or running. In other words, the hybrid drive control means 60 can control the rotation of the first electric motor MG1 at an arbitrary rotation speed while maintaining or controlling the engine rotation speed substantially constant or at an arbitrary rotation speed.

The hybrid drive control means 60 functionally includes an engine output control means outputting commands separately or in a combined manner to an engine output control device not shown to control opening/closing of an electronic throttle valve with a throttle actuator for throttle control, to control a fuel injection amount and an injection timing of a fuel injection device for fuel injection control, and to control a timing of ignition by an ignition device such as an igniter for ignition timing control, so as to provide the output control of the engine 24 such that the necessary engine output is generated.

If an engine start control means 62 determines that the motor running mode using the second electric motor MG2 is switched to the engine running mode using the engine 24 based on, for example, a running mode switching map not depicted for switching a preset vehicle running mode, the engine start control means 62 executes an engine starting process, in which the rotation speed of the engine 24 is electrically raised through the control of the first electric motor MG1 and the second electric motor MG2 and, when the engine rotation speed is raised to a preset ignition-enabled rotation speed, the engine 24 is started by providing the control of fuel injection by the fuel injection device and providing the control of timing of ignition by the ignition device. The running mode switching map is formed as a two-dimensional map consisting of the vehicle speed and the accelerator opening degree Acc corresponding to an operation amount of the accelerator pedal 27, for example, and is divided into a motor running range using the second electric motor MG2 and an engine running range using the engine 24 based on the above description. For example, the motor running range is defined in a relatively lower vehicle speed and lower drive force range (lower accelerator opening degree range) and the engine running range is defined in a medium/higher vehicle speed and medium/higher drive force range (medium/higher accelerator opening degree range).

Therefore, for example, at vehicle start-up or during running with a light load, the motor running using the second electric motor MG2 is implemented and if acceleration running is performed from this state, the motor running mode is switched to the engine running mode. In such a case, the engine start control means 62 executes the engine starting process. When the charge capacity SOC of the electric storage device 32 becomes lower than a preset lower limit capacity, the engine start control means 62 executes the starting process of the engine 24 even if the current running state is within the motor running mode range.

For example, if the accelerator pedal 27 is pressed down during deceleration running, the hybrid drive control means 60 determines the requested output shaft torque Tp* of an output shaft torque Tp (corresponding to a torque of a drive shaft of the present invention) of the output shaft 14 from the drive force map stored in advance based on the accelerator opening degree Acc, the vehicle speed V, etc., as described above. When the requested output shaft torque Tp* is determined, the hybrid drive control means 60 calculates a target engine torque Teng* of the engine 24, a target first electric motor torque Tg* of the first electric motor MG1 (hereinafter referred to as a target first torque Tg*), and a target second electric motor torque Tm* of the second electric motor MG2 (hereinafter referred to as a target second torque Tm*) such that the requested output shaft torque Tp* is acquired. To make a first electric motor torque Tg, a second electric motor torque Tm, and an engine torque Teng equal to the calculated target torques (Tg*, Tm*, and Tp*), the hybrid drive control means 60 controls the torques (hereinafter simply referred to as torques if the first electric motor torque Tg, the second electric motor torque Tm, and the output shaft torque Tp are not particularly distinguished). A change rate of torque (torque rate α) during the change in the torques toward the target torques is determined based on a map of the torque rate α set and stored in advance for each torque, for example, and torque command values are set based on the determined change rate (torque rate α).

When the output shaft torque Tp, the first electric motor torque Tg, and the second electric motor torque Tm change toward the respectively set target torques (tp*, tg*, and tm*), any of the output shaft torque Tp, the first electric motor torque Tg, and the second electric motor torque Tm may be positively/negatively reversed, i.e., when changing toward the target torques, any of the toques may pass through zero during the change, depending on a vehicle running state. In this case, when the corresponding torque passes through zero, a backlash formed with a gear receiving the transmission of the torque is closed in the opposite direction and, therefore, gears collide with each other, generating gear rattling noise.

In this regard, when a drive force request is generated because of pressing down of the accelerator pedal 27 etc., a slow change processing means 66 separately detects the first electric motor torque Tg of the first electric motor MG1, the second electric motor torque Tm of the second electric motor MG2, and the output shaft torque Tp of the output shaft 14 and if any of the toques is positively/negatively reversed, when the corresponding torque passes through zero, the slow change processing means 66 changes the change rate (torque rate α) of the torque to a preset value suppressing the gear rattling noise, thereby slowly changing the torque. Since this reduces the impact of collision of gears with each other occurring because a backlash of a gear formed in, for example, the planetary gear device 26 is closed in the opposite direction when the torque passes through zero, the gear rattling noise generated in this case can be reduced. Specific operation of the slow change processing means 66 will hereinafter mainly be described. In the following description, the control of slowing down the change (achieving a slow change) at the time of passage of a given torque through zero is defined as a slow change process.

Returning to FIG. 3, an individual torque detecting means 72 detects the first electric motor torque Tg of the first electric motor MG1, the second electric motor torque Tm of the second electric motor MG2, and the output shaft torque Tp of the output shaft 14. For example, the individual torque detecting means 72 divides an output Pmg1 of the first electric motor MG1 calculated based on the voltage value and the drive current of the first electric motor MG1 (=voltage value× drive current) by the rotation speed Nmg1 of the first electric motor MG1 to detect (calculate) the first electric motor torque Tg (=Pmg1/Nmg1). For example, the individual torque detecting means 72 divides an output Pmg2 of the second electric motor MG2 calculated based on the voltage value and the drive current of the second electric motor MG2 (=voltage value×drive current) by the rotation speed Nmg2 to detect (calculate) the actual second electric motor torque Tm (=Pmg2/Nmg2) For example, the individual torque detecting means 72 calculates (detects) the output shaft torque Tp based on the engine torque Teng, the first electric motor torque Tg, the second electric motor torque Tm, and a gear ratio ρ of the planetary gear device 26.

The individual torque detecting means 72 can directly detect the first electric motor torque Tg of the first electric motor MG1, the second electric motor torque Tm of the second electric motor MG2, and the output shaft torque Tp of the output shaft 14 by directly disposing torque sensors on the output shaft 14, the first electric motor MG1, and the second electric motor MG2 in addition to the detecting means described above.

When the torques (the first electric motor torque Tg, the second electric motor torque Tm, and the output shaft torque Tp) detected by the individual torque detecting means 72 change toward the target torques (Tg*, Tm*, and Tp*) corresponding to the torques set by the hybrid drive control means 60, a torque reversal determining means 74 determines whether the torques are positively/negatively reversed during the transition period of the change, i.e., whether the torques pass through zero. For example, the torque reversal determining means 74 respectively compares the target first electric motor torque Tg* of the first electric motor MG1, the target second electric motor torque Tm* of the second electric motor MG2, and the requested output shaft torque Tp* of the output shaft 14 obtained by the hybrid drive control means 60 with the first electric motor torque Tg, the second electric motor torque Tm, and the output shaft torque Tp detected by the individual torque detecting means 72 to determine whether the torques are positively/negatively reversed based on the products of the respective torques, for example.

Specifically, the torque reversal determining means 74 determines that the output shaft torque Tp is positively/negatively reversed if the product of the requested output shaft torque Tp* determined by the hybrid drive control means 60 and the output shaft torque Tp detected by the individual torque detecting means 72 is negative. The torque reversal determining means 74 determines that the first electric motor torque Tg is positively/negatively reversed if the product of the target first torque Tg* determined by the hybrid drive control means 60 and the first electric motor torque Tg detected by the individual torque detecting means 72 is negative. The torque reversal determining means 74 determines that the second electric motor torque Tm is positively/negatively reversed if the product of the target second torque Tm* determined by the hybrid drive control means 60 and the second electric motor torque Tm detected by the individual torque detecting means 72 is negative.

If the torque reversal determining means 74 determines that any of the first electric motor torque Tg of the first electric motor MG1, the second electric motor torque Tm of the second electric motor MG2, and the output shaft torque Tp of the output shaft 14 is positively/negatively reversed, when the corresponding torque passes through zero, a reversal torque rate changing means 75 (hereinafter referred to as a torque rate changing means 75) changes a change rate of the torque to a preset change rate (torque rate α) suppressing the gear rattling noise. The torque rate α set at the time of passage of the torque through zero is made smaller than the normal torque rate α set if zero is not passed through. The torque rate changing means 75 preliminarily stores the relationship of the change rate of torque (torque rate α) set when the first electric motor torque Tg, the second electric motor torque Tm, and the output shaft torque Tp pass through zero, for example, and when any of the torques passes through zero, the torque rate changing means 75 changes the normal torque rate α to the torque rate α at the time of passage of the torque through zero. The torque rate α stored in the torque rate changing means 75 is a value obtained empirically or analytically in advance and is set to a value preferably reducing the gear rattling noise generated when the corresponding torque passes through zero.

Figure 4:
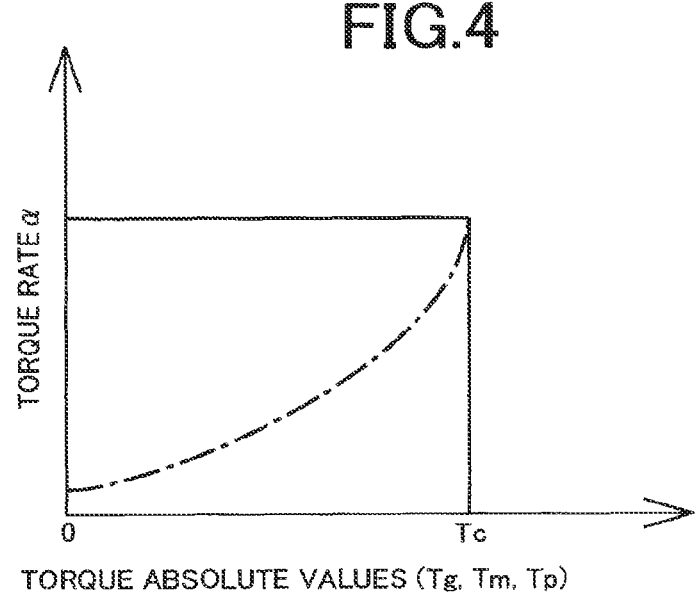
FIG. 4 is a diagram of one specific example of the torque rate set at the time of passage of the torque through zero.

For example, as indicated by a heavy solid line of FIG. 4, one specific example of the torque rate α stored in the torque rate changing means 75 is a predetermined torque rate α (constant value) suppressing the gear rattling noise set and stored in advance to be set when an absolute value of torque falls within a range of a boundary value Tc (absolute value). Specifically, the torque rate changing means 75 preliminarily stores the boundary value Tc of torque for determining a state in which the torque passes through zero and a torque rate α to be set in this state. Therefore, if the torque falls within the range of the boundary value Tc set in advance, the torque linearly changes based on the set torque rate α. The boundary value Tc (absolute value) of the torque and the torque rate α are empirically or computationally set to optimum values in advance and are set such that the gear rattling noise is reduced because the slow change of torque is slowly achieved when the torque passes through zero. The boundary value Tc of the torque and the predetermined torque rate α may be changed based on a difference between the requested output shaft torque Tp* and the actual output shaft torque Tp when the accelerator pedal 27 is pressed down or temperatures of the electric motors, for example.

For example, as indicated by a dashed dot line of FIG. 4, another specific example of the torque rate α stored in the torque rate changing means 75 may be the torque rate α that is a relationship changed depending on an absolute value of torque. For example, a relationship between an absolute value of torque and the torque rate α is set in a two-dimensional map in advance as depicted in FIG. 4 and the torque rate α is set in accordance with the two-dimensional map. Specifically, the torque rate α is set to be smaller as the torque (absolute value) becomes smaller as depicted in FIG. 4. Therefore, when the torque passes through zero, the change in torque is slowly made. The two-dimensional map of the torque rate α changing depending on an absolute value of torque is empirically or computationally set in advance and is set to a value preferably reducing the gear rattling noise generated when the torque passes through zero. The torque (absolute value) necessary for setting the torque rate α is sequentially detected by the individual torque detecting means 72.

The slow change processing means 66 sets a torque command value of the positively/negatively reversed torque based on the torque rate α set by the torque rate changing means 75 and provides control (e.g., feedback control) of the torque passing through zero based on the torque command value. When the positively/negatively reversed torque passes through zero, the slow change processing means 66 slowly makes the slow change of the torque, thereby suppressing the gear rattling noise generated because a backlash of a gear is closed in the opposite direction.

If a change in torque is slowed due to the slow change process by the slow change processing means 66 when the positively/negatively reversed torque passes through zero, a torque shortage conversely occurs in the output shaft torque Tp. In this regard, a torque compensating means 76 provides control such that the shortage is compensated by a torque on the side not passing through zero (on the side not subjected to the slow change) while the slow change process is executed when the positively/negatively reversed torque passes through zero, so as to compensate the shortage of the output shaft torque Tp and suppress the effect on running performance to the minimum. For example, while the first electric motor torque Tg is subjected to the slow change process, the shortage of the output shaft torque Tp is compensated by the second electric motor torque Tm and while the second electric motor torque Tm is subjected to the slow change process, the shortage of the output shaft torque Tp is compensated by the first electric motor torque Tg to suppress the effect on running performance.

The torque compensating means 76 sets a torque command value on the side without positive/negative reversal based on the command value of the output shaft torque Tp set by the hybrid drive control means 60 and the torque command value at the time of the slow change process of the positively/negatively reversed torque set by the slow change processing means 66, and provides control (e.g., feedback control) of torque on the side without positive/negative reversal based on the torque command value. Specifically, the torque compensating means 76 sets the torque command value on the side without positive/negative reversal such that the output shaft torque Tp becomes substantially equivalent to the torque command value set by the hybrid drive control means 60. For example, if the first electric motor torque Tg is positively/negatively reversed, the command value of the second electric motor torque Tm is set to a value at which the command value of the output shaft torque Tp is output for the torque command value when the first electric motor torque Tg is subjected to the slow change process. In this case, the second electric motor torque Tm is arithmetically obtained based on the engine torque Teng, the torque command value of the first electric motor torque Tg, and the gear ratio ρ of the planetary gear device 26. The execution of the torque compensating means 76 compensates the shortage of the output shaft torque Tp even if the slow change process is executed and, therefore, the effect of the slow change process on running performance is suppressed.

The torque compensating means 76 is implemented while the engine 24 is in operation and cannot be implemented while the engine in stopped. Since the first electric motor MG1 enters an idle state when the engine 24 is stopped, the shortage of the output shaft torque Tp cannot be compensated by the first electric motor MG1 even if the second electric motor torque Tm passes through zero. Additionally, since the first electric motor MG1 idles (torque becomes zero), the first electric motor torque Tg does not pass through zero. Whether the engine 24 is in operation is determined based on an engine drive command etc., of the hybrid drive control means 60, for example.

As described above, the execution of the slow change processing means 66 and the torque compensating means 76 reduces the gear rattling noise generated when any of the first electric motor torque Tg, the second electric motor torque Tm, and the output shaft torque Tp passes through zero, and suppresses the effect of the slow change process on running performance.

Figure 5:
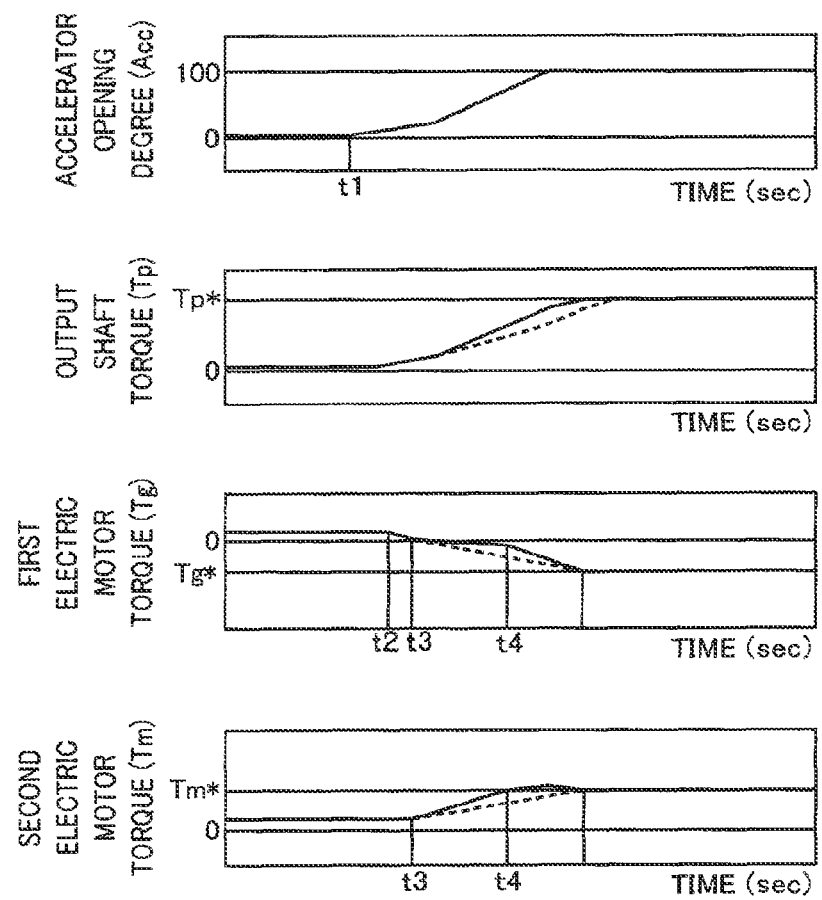
FIG. 5 is a time chart for explaining an example of operation when the slow change processing means is executed in the case of the positive/negative reversal of the first electric motor torque of the first electric motor.

First, the case of the positive/negative reversal of the electric motor torque Tg of the first electric motor MG1 (the change in the first electric motor torque Tg passing through zero) will be described as a specific form. FIG. 5 is a time chart for explaining an example of operation when the slow change processing means 66 is executed in the case of the positive/negative reversal of the first electric motor torque Tg of the first electric motor MG1. FIG. 5 depicts the case of the positive/negative reversal of the first electric motor torque Tg from a negative value to a positive value when the accelerator pedal 27 is pressed down for acceleration from the coasting state in which the accelerator pedal 27 is not pressed down, for example.

In FIG. 5, when the accelerator pedal 27 is pressed down at time point t1, as indicated by a solid line of FIG. 5, the requested output shaft torque Tp* is correspondingly calculated based on the accelerator opening degree Acc and the vehicle speed V, and the target first torque Tg* of the first electric motor MG1 and the target second torque Tm* of the second electric motor MG2 are calculated such that the requested output shaft torque Tp* is output. It is then determined whether each of the torques is positively/negatively reversed based on the torque reversal determining means 74. In FIG. 5, since the first electric motor torque Tg is positively/negatively reversed, the slow change processing means 66 (the torque rate changing means 75) and the torque compensating means 76 correspondingly set the command values of the output shaft torque Tp, the first electric motor torque Tg, and the second electric motor torque Tm. For example, the command value of the output shaft torque Tp indicated by a solid line is set based on the output shaft torque Tp detected by the individual torque detecting means 72 and the requested output shaft torque Tp*. The torque rate changing means 75 changes the torque rate α at the time of passage of the first electric motor torque Tg of the first electric motor MG1 through zero, and the slow change processing means 66 sets the command value of the first electric motor torque Tg based on the torque rate α. The torque compensating means 76 sets the command value of the second electric motor torque Tm so as to compensate the shortage of the output shaft torque Tp occurring when the first electric motor torque Tg is subjected to the slow change process. The slow change processing means 66 provides control such that the first electric motor torque Tg changes along the set torque command value. The torque compensating means 76 provides control such that the second electric motor torque Tm changes along the set torque command value. Although solid lines of FIG. 5 indicate the command values of the torques, the actual torques are also changed in substantially the same manner as the command values and, therefore, the solid lines may be considered as the actual torques.

In FIG. 5, when the first electric motor torque Tg decreases from time point t2 as a starting point and comes closer to zero at time point t3, the torque rate α is changed and the torque is slowly reduced. A conventional first electric motor torque Tg is indicated by a broken line. In the conventional case, as indicated by the broken line, the torque is reduced at a predetermined torque rate α even when the first electric motor torque Tg passes through zero. As described above, a change in torque is slowed (made as slow change) when the first electric motor torque Tg passes through zero, thereby reducing the gear rattling noise generated when the first electric motor torque Tg passes through zero. Specifically, when the first electric motor torque Tg passes through zero, since a backlash formed with a gear (toothed wheel) coupled to the first electric motor MG1 in a power transmittable manner is closed in the opposite direction, gears collide with each other and generate the gear rattling noise. In contrast, if the slow change process is executed, the impact of collision of the gears is mitigated and the gear rattling noise is reduced. The torque rate α at the time of passage of the first electric motor torque Tg through zero is empirically or analytically obtained in advance and is set to a value capable of preferably suppressing the gear rattling noise generated when the first electric motor torque Tg passes through zero.

With regard to the second electric motor torque Tm, the torque is increased as compared to a conventional torque indicated by a broken line from time point t3 to t4 while the first electric motor torque Tg is subjected to the slow change process. The output of the second electric motor torque Tm as described above suppresses the torque shortage of the output shaft torque tp occurring when the first electric motor torque Tg is subjected to the slow change process, suppressing the effect on running performance. If the torque compensation with the second electric motor torque Tm is not implemented, the output shaft torque Tp becomes insufficient as indicated by a broken line.

Figure 6:
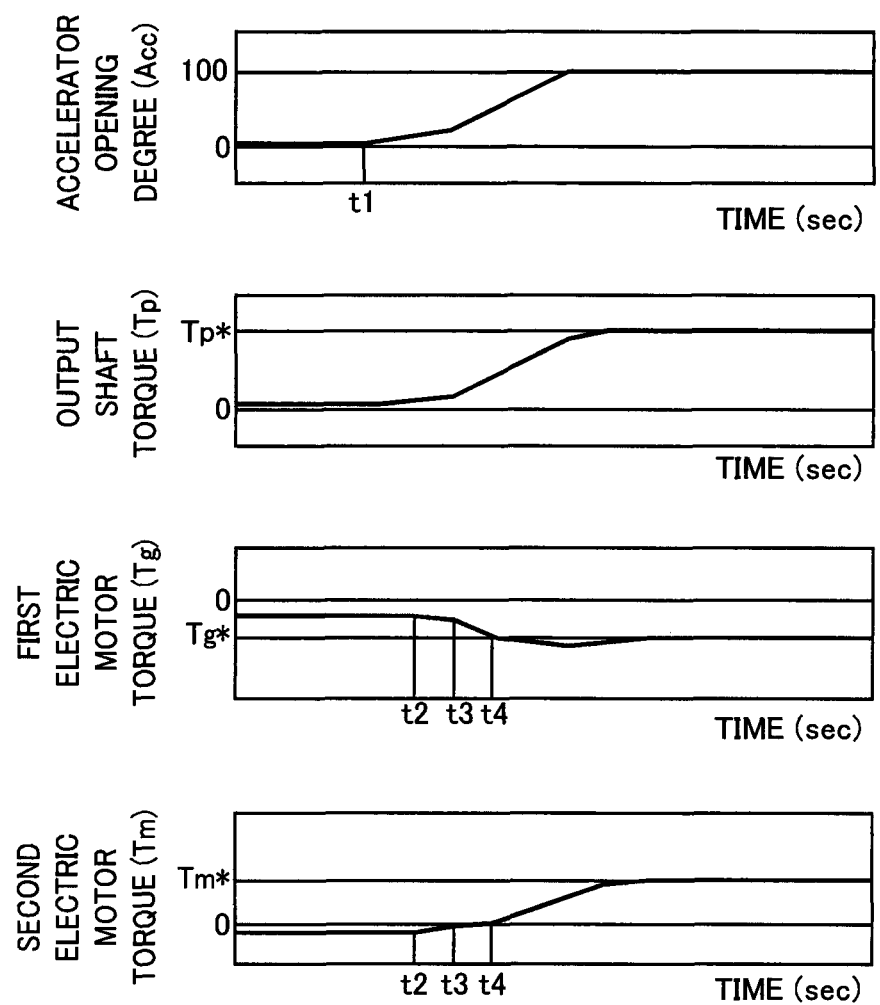
FIG. 6 is a time chart for explaining an example of operation when the slow change processing means is executed in the case of the positive/negative reversal of the second electric motor torque of the second electric motor.

The case of the positive/negative reversal of the second electric motor torque Tm of the second electric motor MG2 (passage of the second electric motor torque Tg through zero) will then be described. FIG. 6 is a time chart for explaining an example of operation when the slow change processing means 66 is executed in the case of the positive/negative reversal of the second electric motor torque Tm of the second electric motor MG2. FIG. 6 depicts the positive/negative reversal of the second electric motor torque Tm from a negative value to a positive value when the accelerator pedal 27 is pressed down for acceleration from the regenerative running state using the second electric motor MG2 in which the accelerator pedal 27 is not pressed down, for example.

In FIG. 6, when the accelerator pedal 27 is pressed down at time point t1, as indicated by a solid line of FIG. 6, the requested output shaft torque Tp* is calculated based on the accelerator opening degree Acc and the vehicle speed V, and the target first torque Tg* of the first electric motor MG1 and the target second torque Tm* of the second electric motor MG2 are calculated such that the requested output shaft torque Tp* is output. It is then determined whether each of the torques is positively/negatively reversed based on the torque reversal determining means 74. In FIG. 6, since the second electric motor torque Tm is positively/negatively reversed, the slow change processing means 66 (the torque rate changing means 75) and the torque compensating means 76 correspondingly set the command values of the output shaft torque Tp, the first electric motor torque Tg, and the second electric motor torque Tm. For example, the torque command value of the output shaft torque Tp is set based on the actual output shaft torque Tp and the calculated requested output shaft torque Tp*. The torque rate changing means 75 changes the torque rate α at the time of passage of the second electric motor torque Tm through zero, and the slow change processing means 66 sets the command value of the second electric motor torque Tm based on the changed torque rate α. The torque compensating means 76 sets the torque command value of the first electric motor torque Tg so as to compensate the shortage of the output shaft torque Tp occurring when the second electric motor torque Tm is subjected to the slow change process. The slow change processing means 66 provides control such that the second electric motor torque Tm changes along the set torque command value. The torque compensating means 76 provides control such that the first electric motor torque Tg changes along the set torque command value.

In FIG. 6, when the second electric motor torque Tm increases from time point t2 as a starting point and comes closer to zero at time point t3, the torque rate α is changed and the change in torque of the second electric motor torque Tm is slowed (made as slow change). As described above, a change in torque is slowed when the second electric motor torque Tm passes through zero, thereby reducing the gear rattling noise generated when the second electric motor torque Tm passes through zero. The torque rate α at the time of passage of the second electric motor torque Tm through zero is empirically or analytically obtained in advance and is set to a value capable of preferably suppressing the gear rattling noise generated when the second electric motor torque Tm passes through zero.

With regard to the first electric motor torque Tg, a change in the torque is increased from time point t3 to time point t4 while the second electric motor torque Tm is subjected to the slow change process. The setting of the command value of the first electric motor torque Tg as described above suppresses the torque shortage of the output shaft torque Tp occurring when the second electric motor torque Tm is subjected to the slow change process, suppressing the effect on running performance.

The case of the positive/negative reversal of the output shaft torque Tp of the output shaft 14 will then be described. Such a state corresponds to the case of pressing down the accelerator pedal 27 during the deacceleration running with the brake pedal 29 lightly pressed down, for example. Even in such a case, the requested output shaft torque Tp* is calculated based on the accelerator opening degree Acc and the vehicle speed V, and the target first torque Tg* of the first electric motor MG1 and the target second torque Tm* of the second electric motor MG2 are calculated such that the requested output shaft torque Tp* is output. If it is determined that the output shaft torque Tp passes through zero based on the torque reversal determining means 74, the slow change processing means 66 changes the torque rate α at the time of passage of the output shaft torque Tp through zero based on the torque rate changing means 75, and sets the command value of the output shaft torque Tp based on the changed torque rate α. The slow change processing means 66 provides control such that the output shaft torque Tp changes along the set torque command value. The torque rate α at the time of passage of the output shaft torque Tp through zero is empirically or analytically obtained in advance and is set to a value suppressing the gear rattling noise generated when the output shaft torque Tp passes through zero.

As described above, if the torque reversal determining means 74 determines that any of the output shaft torque Tp, the first electric motor torque Tg, and the second electric motor torque Tm is positively/negatively reversed, the slow change processing means 66 (the torque rate changing means 75) changes the torque rate α at the time of passage of the corresponding torque through zero such that a change in the torque is slowed, thereby suppressing the gear rattling noise generated when the torque passes through zero. The torque compensating means 76 compensates the torque shortage of the output shaft torque Tp with the torque on the side not subjected to the slow change process, thereby solving the torque shortage.

Figure 7:
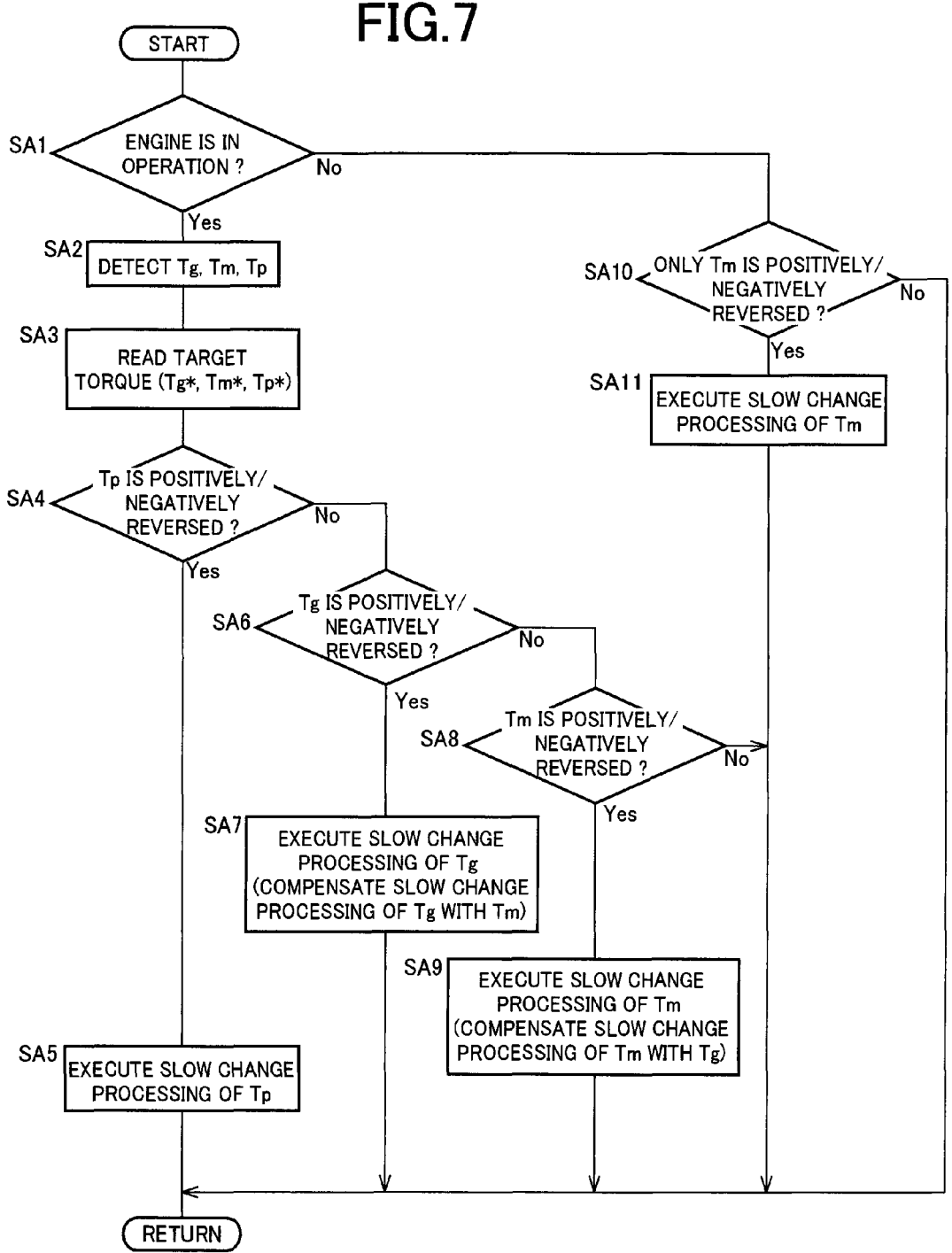
FIG. 7 is a flowchart for explaining a main portion of the control operation of the electronic control unit, i.e., the control operation for reducing the gear rattling noise generated when any of the first electric motor torque of the first electric motor, the second electric motor torque of the second electric motor, and the output shaft torque of the output shaft is positively/negatively reversed.

FIG. 7 is a flowchart for explaining a main portion of the control operation of the electronic control unit 28, i.e., the control operation for reducing the gear rattling noise generated when any of the first electric motor torque Tg of the first electric motor MG1, the second electric motor torque Tm of the second electric motor MG2, and the output shaft torque Tp of the output shaft 14 is positively/negatively reversed, and is repeatedly executed with a cycle time, for example, on the order of few msec to a few tens of msec.

In FIG. 7, at step SA1 (hereinafter, step will be omitted) corresponding to the hybrid drive control means 60, it is determined whether the engine is in operation. If SA1 is affirmative, the first electric motor torque Tg of the first electric motor MG1, the second electric motor torque Tm of the second electric motor MG2, and the output shaft torque Tp of the output shaft 14 are detected at SA2 corresponding to the individual torque detecting means 72. At SA3 corresponding to the hybrid drive control means 60, the target first torque Tg* of the first electric motor MG1, the target second torque Tm* of the second electric motor MG2, and the requested output shaft torque Tp* of the output shaft 14 are read. At SA4 corresponding to the torque reversal determining means 74, it is determined whether the output shaft torque Tp of the output shaft 14 is positively/negatively reversed. Specifically, for example, the determination is made based on whether the product of the output shaft torque Tp and the requested output shaft torque Tp* is negative. If SA4 is affirmative, the slow change process of the output shaft torque Tp is executed at SA5 corresponding to the slow change processing means 66 (the torque rate changing means 75).

On the other hand, if SA4 is negative, it is determined whether the first electric motor torque Tg is positively/negatively reversed at SA6 corresponding to the torque reversal determining means 74. Specifically, for example, the positive/negative reversal of the first electric motor torque Tg is determined based on whether the product of the first electric motor torque Tg and the target first torque Tg* is negative. If SA6 is affirmative, the slow change process of the first electric motor torque Tg is executed to slow down a change in torque when the first electric motor torque Tg passes through zero, at SA7 corresponding to the slow change processing means 66, the torque rate changing means 75, and the torque compensating means 76. A torque is accordingly output as a result of the torque compensation with the second electric motor torque Tm for the torque shortage of the output shaft torque Tp due to the slow change process.

On the other hand, if SA6 is negative, it is determined whether the second electric motor torque Tm is positively/negatively reversed at SA8 corresponding to the torque reversal determining means 74. Specifically, for example, the positive/negative reversal of the second electric motor torque Tm is determined based on whether the product of the second electric motor torque Tm and the target second torque Tm* is negative. If SA8 is affirmative, the slow change process of the second electric motor torque Tm is executed to slow a change in torque when the second electric motor torque Tm passes through zero, at SA9 corresponding to the slow change processing means 66, the torque rate changing means 75, and the torque compensating means 76. A torque is accordingly output as a result of the torque compensation with the first electric motor torque Tg for the torque shortage of the output shaft torque Tp due to the slow change process.

Returning to SA1, if SA1 is negative, it is determined whether the second electric motor torque Tm is positively/negatively reversed at SA10 corresponding to the torque reversal determining means 74. If SA10 is affirmative, the slow change process of the second electric motor torque Tm is executed to slow down a change in torque when the second electric motor torque Tm passes through zero, at SA11 corresponding to the slow change processing means 66 and the torque rate changing means 75. Since the engine 24 is stopped in this case, the torque compensation with the first electric motor torque Tg is not performed. On the other hand, if SA10 is negative, this routine is terminated.

Figure 8:
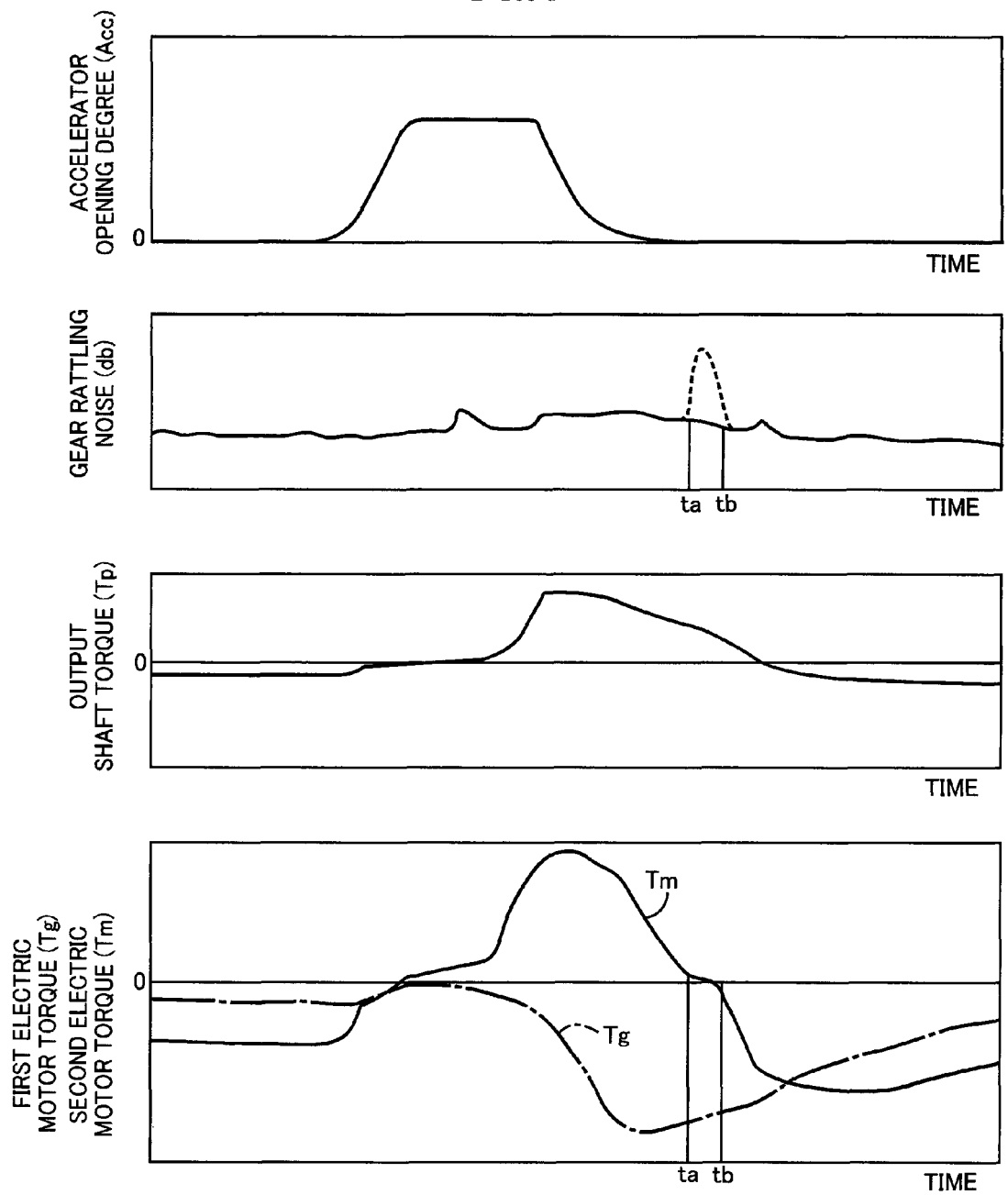
FIG. 8 is a flowchart of an example of the effect of reducing the gear rattling noise if the slow change process is executed.

FIG. 8 depicts an example of the effect of reducing the gear rattling noise if the slow change process is executed. FIG. 8 depicts a state when the slow change process of the second electric motor torque Tm is executed. As depicted in FIG. 8, the slow change process of the second electric motor torque Tm indicated by a solid line is executed from time point ta to time point tb. In this period, the gear rattling noise is almost not changed as indicated by a solid line, i.e., the gear rattling noise is reduced. If the slow change process is not executed, the gear rattling noise is locally increased as indicated by a broken line when the second electric motor torque Tm passes through zero. In other words, it is depicted that the gear rattling noise is effectively reduced by executing the slow change process.

As described above, according to the present embodiment, when any torque of the output shaft torque Tp, the first electric motor torque Tg, and the second electric motor torque Tm passes through zero, the torque is slowly changed at a preset change rate suppressing gear rattling noise, thereby preferably suppressing the gear rattling noise generated when the torque passes through zero. If a torque of one of the first electric motor MG1 and the second electric motor MG2 is slowly changed, a shortage of the output shaft torque Tp occurring in association with the slow change is compensated by a torque of the other not slowly changed, thereby solving the torque shortage of the output shaft torque Tp due to the slow change and suppressing the effect on running performance.

According to the present embodiment, when the first electric motor torque Tg passes through zero, the torque is slowly changed at a change rate suppressing the gear rattling noise, thereby preferably suppressing the gear rattling noise. In this case, since the shortage of the output shaft torque Tp is compensated with the second electric motor torque Tm, the effect of the slow change of the first electric motor torque Tg on running performance is suppressed. When the second electric motor torque Tm passes through zero, the torque is slowly changed at a change rate suppressing the gear rattling noise, thereby preferably suppressing the gear rattling noise. In this case, since the shortage of the output shaft torque Tp is compensated with the first electric motor torque Tg, the effect of the slow change of the second electric motor torque Tm on running performance is suppressed. While the engine is stopped, since the first electric motor MG1 is in an idle state and the first electric motor torque Tg is zero, the first electric motor torque Tg does not pass through zero and the compensation with the first electric motor torque Tg is impossible. Therefore, while the engine is in operation, the torque compensating means 76 can preferably be implemented.

According to the present embodiment, the change rate of torque at the time of execution of the slow change processing means 66 is set based on a preset two-dimensional map configured with an absolute value of torque and a change rate of torque. In this way, a preferably change rate of torque can be set based on the two-dimensional map and the gear rattling noise can preferably be suppressed.

According to the present embodiment, the change rate of torque at the time of execution of the slow change processing means 66 is a predetermined value set in advance and suppressing the gear rattling noise. In this way, when the torque passes through zero, the change rate of torque is set to the predetermined value suppressing the gear rattling noise, and the gear rattling noise can preferably be suppressed.

Other embodiments of the present invention will then be described. In the following description, the portions in common with the embodiment will be denoted by the same reference numerals and will not be described in detail.

Second Embodiment

Figure 9:
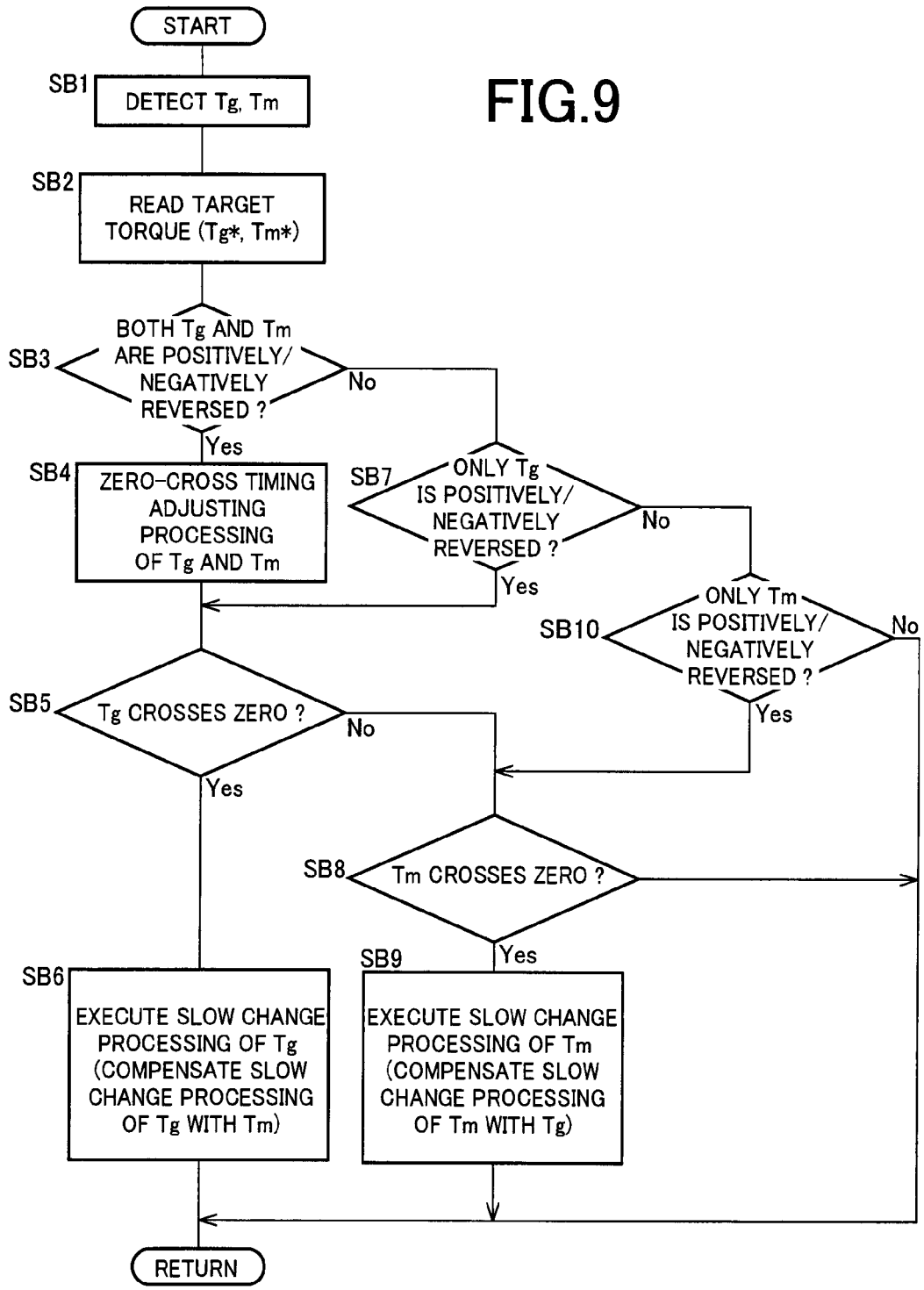
FIG. 9 is a flowchart of a main portion of the control operation of the electronic control unit of another embodiment of the present invention for reducing the gear rattling noise generated when both the first electric motor torque and the second electric motor torque are positively/negatively reversed, especially.

In this embodiment, description will be made of the case that both the first electric motor torque Tg and the second electric motor torque Tm are positively/negatively reversed. If it is determined that both the first electric motor torque Tg and the second electric motor torque Tm are positively/negatively reversed, the slow change processing means 66 adjusts order, timing, etc., such that the timing of slowly changing the first electric motor torque Tg does not overlap the timing of slowly changing the second electric motor torque Tm. FIG. 9 is a flowchart of a main portion of the control operation of the electronic control unit 28 of another embodiment of the present invention for reducing the gear rattling noise generated when both the first electric motor torque Tg and the second electric motor torque Tm are positively/negatively reversed.

In FIG. 9, at step SB1 (hereinafter, step will be omitted) corresponding to the individual torque detecting means 72, the first electric motor torque Tg and the second electric motor torque Tm are detected. At SB2 corresponding to the hybrid drive control means 60, the target first torque Tg* of the first electric motor MG1 and the target second torque Tm* of the second electric motor MG2 are read. At SB3 corresponding to the torque reversal determining means 74, it is determined whether both the first electric motor torque Tg and the second electric motor torque Tm are positively/negatively reversed. If SB3 is affirmative, the timing of passage of the first electric motor torque Tg and the second electric motor torque Tm through zero is adjusted at SB4 corresponding to the slow change processing means 66 and the torque rate changing means 75. Specifically, for example, the respective torques are adjusted such that the timing of passage of the first electric motor torque Tg through zero does not overlap the timing of passage of the second electric motor torque Tm through zero. The adjustment is made as described above so as to enable the implementation of the torque compensation with the other torque while one torque is subjected to the slow change process. Which of the first electric motor torque Tg and the second electric motor torque Tm is first subjected to the slow change process is determined based on the responsiveness of the output shaft torque Tp, for example. At SB5 corresponding to the individual torque detecting means 72, the first electric motor torque Tg is detected and it is determined whether the first electric motor torque Tg is in the state of passing through zero (the first electric motor torque Tg is close to zero). If SB5 is affirmative, the slow change process of the first electric motor torque Tg is executed at SB6 corresponding to the slow change processing means 66 and the torque compensating means 76. The torque compensation with the second electric motor torque Tm is correspondingly performed. While the engine is stopped, the torque compensation with the second electric motor torque Tm is not performed.

On the other hand, if SB5 is negative, it is determined whether the second electric motor torque Tm is in the state of passing through zero at SB8 corresponding to the individual torque detecting means 72. If SB8 is affirmative, the slow change process of the second electric motor torque Tm is executed at SB9 corresponding to the slow change processing means 66 and the torque compensating means 76. The torque compensation with the first electric motor torque Tg is correspondingly performed. While the engine is stopped, the torque compensation with the first electric motor torque Tg is not performed. On the other hand, if SB8 is negative, this routine is terminated.

Returning to SB3, if SB3 is negative, it is determined whether the first electric motor torque Tg is positively/negatively reversed at SB7 corresponding to the torque reversal determining means 74. If SB7 is affirmative, this routine goes to SB5 and steps after SB5 are executed. If SB7 is negative, it is determined whether the second electric motor torque Tm is positively/negatively reversed at SB10 corresponding to the torque reversal determining means 74. If SB10 is affirmative, this routine goes to SB8 and steps after SB8 are executed. On the other hand, if SB10 is negative, this routine is terminated.

Figure 10:
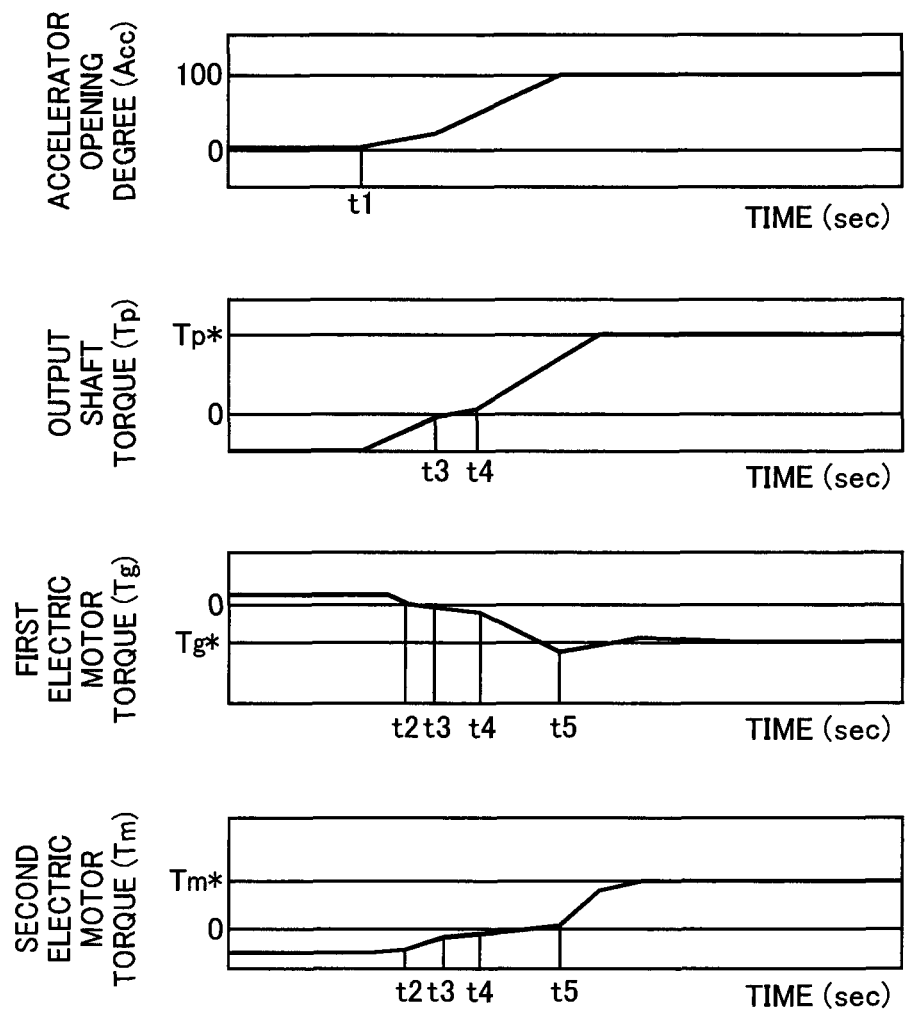
FIG. 10 is a time chart of an example of operation when the slow change processing means is executed in the case of the positive/negative reversal of the first electric motor torque of the first electric motor and the second electric motor torque of the second electric motor.

FIG. 10 is a time chart of an example of operation when the slow change processing means 66 is executed in the case of the positive/negative reversal of the first electric motor torque Tg of the first electric motor MG1 and the second electric motor torque Tm of the second electric motor MG2. FIG. 10 corresponds to such a case that acceleration running is performed by pressing down the accelerator pedal 27 from deceleration running with the brake pedal 29 pressed down, for example.

In FIG. 10, when the accelerator pedal 27 is pressed down at time point t1, the requested output shaft torque Tp* is calculated based on the accelerator opening degree Acc and the vehicle speed V, and the target first torque Tg* of the first electric motor MG1 and the target second torque Tm* of the second electric motor MG2 are calculated such that the requested output shaft torque Tp* is output. It is then determined whether each of the torques is positively/negatively reversed based on the torque reversal determining means 74. In FIG. 10, it is determined that the output shaft toque Tp, the first electric motor torque Tg, and the second electric motor torque Tm are positively/negatively reversed. In this case, the slow change processing means 66 and the torque rate changing means 75 make a change to the torque rate α suppressing the gear rattling noise generated when each torque passes through zero, and set the command values of the output shaft torque Tp, the first electric motor torque Tg, and the second electric motor torque Tm based on the torque rate α. For example, the slow change processing means 66 and the torque rate changing means 75 first set the command value of the output shaft torque Tp based on the torque rate α set when the output shaft torque Tp passes through zero. Specifically, the command value of the output shaft torque Tp is set such that the output shaft torque Tp slowly changes when passing through zero so as to suppress the gear rattling noise. The command values of the first electric motor torque Tg and the second electric motor torque Tm are then set based on the set command value of the output shaft torque Tp.

Since the first electric motor torque Tg and the second electric motor torque Tm also pass through zero, the torque rate changing means 75 changes the torque rate α such that the gear rattling noise is not generated when each of the first electric motor torque Tg and the second electric motor torque Tm passes through zero, and the respective torque command values are set based on the torque rate α. The timings of the slow change process of the first electric motor torque Tg and the slow change process of the second electric motor torque Tm are adjusted such that the processes are not executed at overlapping timing. In the setting of FIG. 10, first, the slow change process of the first electric motor torque Tg is executed from time point t2 to time point t3; the slow change process of the output shaft torque Tp is executed from time point t3 to time point t4; and the slow change process of the second electric motor torque Tm is executed from time point t4 to time point t5.

For example, from time point t2 to time point t3, the command value is set such that the torque is slowly changed when the first electric motor torque Tg passes through zero while the command value is set such that the second electric motor torque Tm is output so as to compensate the shortage of the output shaft torque Tp due to the slow change process of the first electric motor torque Tg. From time point t3 to time point t4, the command value is set such that the torque is slowly changed when the output shaft torque Tp passes through zero. From time point t4 to time point t5, the command value is set such that the torque is slowly changed when the second electric motor torque Tm passes through zero while the command value is set such that the first electric motor torque Tg is output so as to compensate the shortage of the output shaft torque Tp due to the slow change process of the second electric motor torque Tm.

When the slow change processing means 66, the torque rate changing means 75, and the torque compensating means 76 set the command values of the output shaft torque Tp, the first electric motor torque Tg, and the second electric motor torque Tm, the slow change processing means 66 and the torque compensating means 76 provide control (feedback control) such that the actual output shaft torque Tp, first electric motor torque Tg, and second electric motor torque Tm change along the command values. As a result, the gear rattling noise generated when each of the output shaft torque Tp, the first electric motor torque Tg, and the second electric motor torque Tm passes through zero is suppressed. When the first electric motor torque Tg is subjected to the slow change process, the shortage of the output shaft torque Tp is compensated with the second electric motor torque Tm, and when the second electric motor torque Tm is subjected to the slow change process, the shortage of the output shaft torque Tp is compensated with the first electric motor torque Tg, thereby solving the shortage of the output shaft torque Tp.

Figure 11:
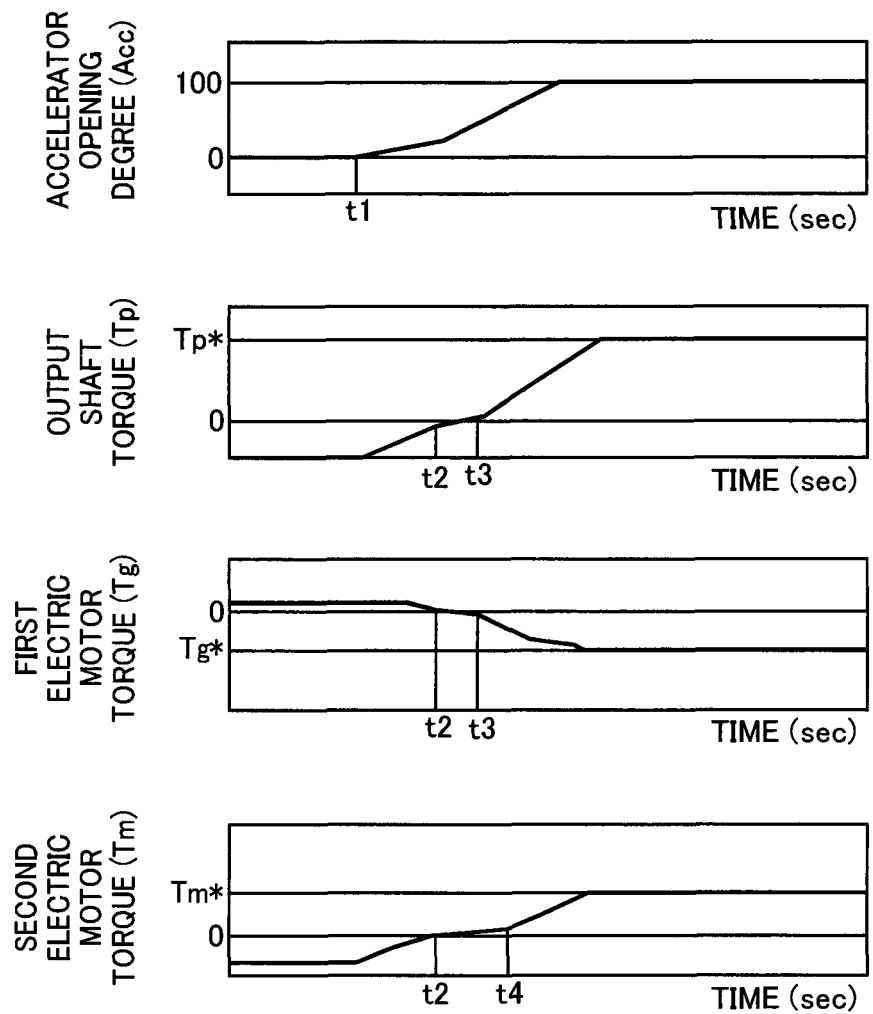
FIG. 11 is another time chart of an example of operation when the slow change processing means is executed in the case of the positive/negative reversal of the first electric motor torque of the first electric motor and the second electric motor torque of the second electric motor.

Although the slow change process of the first electric motor torque Tg and the slow change process of the second electric motor torque Tm are executed at timings shifted from each other such that the processes are not executed at the same time in FIG. 10, a form of concurrently executing the slow change process of the first electric motor torque Tg and the slow change process of the second electric motor torque Tm may also be available as depicted in FIG. 11. As depicted in FIG. 11, at time point t2, the slow change processes of the output shaft torque Tp, the first electric motor torque Tg, and the second electric motor torque Tm are started at substantially the same time. Even if the control is provided in this way, the gear rattling noise is reduced that is generated when the torques pass through zero. However, since the slow change process of the first electric motor torque Tg and the slow change process of the second electric motor torque Tm are executed at the same time, the compensation of the shortage of the output shaft torque Tp becomes difficult.

As described above, this embodiment can acquire the same effect as the embodiment described earlier. If it is determined that the torques of both the first electric motor MG1 and the second electric motor MG2 change and pass through zero during the torque control, the adjustment is made such that the timing of slowly changing the first electric motor torque Tg and the timing of slowly changing the second electric motor torque Tm are not overlapped with each other and, therefore, the torque compensation by the second electric motor MG2 is enabled when the first electric motor torque Tg is slowly changed while the torque compensation by the first electric motor MG1 is enabled when the second electric motor torque Tm is slowly changed.

Third Embodiment

Figure 12:
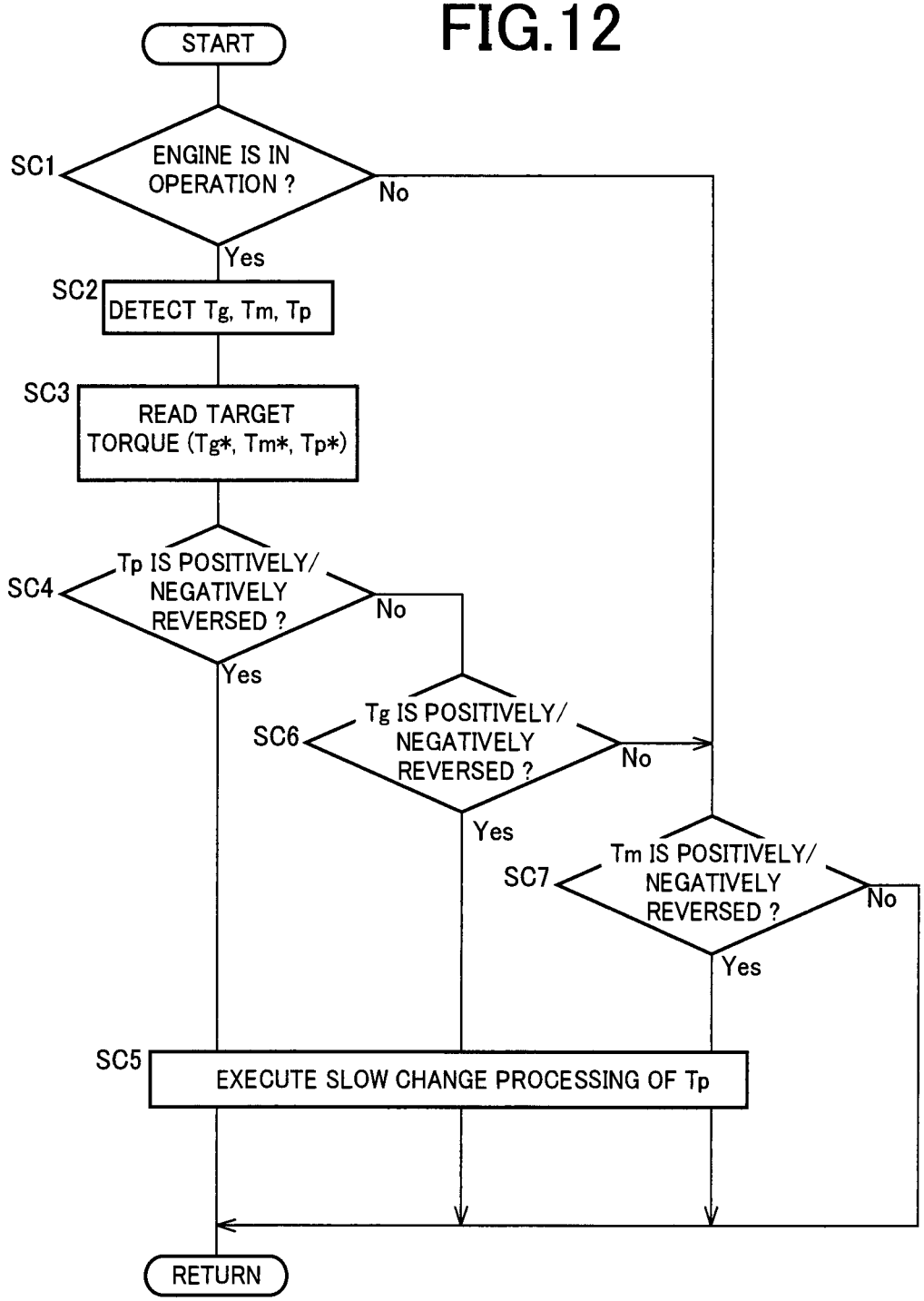
FIG. 12 is a flowchart for explaining a main portion of the control operation of the electronic control unit of another embodiment of the present invention, i.e., the control operation of executing the slow change process of the output shaft torque for suppressing the gear rattling noise when any of the output shaft torque, the first electric motor torque, and the second electric motor torque is positively/negatively reversed, especially.

FIG. 12 is a flowchart for explaining a main portion of the control operation of the electronic control unit 28 of another embodiment of the present invention, i.e., the control operation of executing the slow change process of the output shaft torque Tp for suppressing the gear rattling noise when any of the output shaft torque Tp, the first electric motor torque Tg, and the second electric motor torque Tm is positively/negatively reversed.

In FIG. 12, at step SC1 (hereinafter, step will be omitted) corresponding to the hybrid drive control means 60, it is determined whether the engine is in operation. If SC1 is affirmative, the first electric motor torque Tg of the first electric motor MG1, the second electric motor torque Tm of the second electric motor MG2, and the output shaft torque Tp of the output shaft 14 are detected at SC2 corresponding to the individual torque detecting means 72. At SC3 corresponding to the hybrid drive control means 60, the target first torque Tg* of the first electric motor MG1, the target second torque Tm* of the second electric motor MG2, and the requested output shaft torque Tp* of the output shaft 14 are read. At SC4 corresponding to the torque reversal determining means 74, it is determined whether the output shaft torque Tp is positively/negatively reversed. If SC4 is affirmative, the slow change process of the output shaft torque Tp is executed at SC5 corresponding to the slow change processing means 66 and the torque rate changing means 75. On the other hand, if SC4 is negative, it is determined whether the first electric motor torque Tg is positively/negatively reversed at SC6 corresponding to the torque reversal determining means 74. If SC6 is affirmative, the slow change process of the output shaft torque Tp is executed at SC5 corresponding to the slow change processing means 66. On the other hand, if SC6 is negative, it is determined whether the second electric motor torque Tm is positively/negatively reversed at SC7 corresponding to the torque reversal determining means 74. If SC7 is affirmative, the slow change process of the output shaft torque Tp is executed at SC5 corresponding to the slow change processing means 66. On the other hand, if SC7 is negative, this routine is terminated. Returning to SC1, if SC1 is negative, this routine goes to SC7 and steps after SC7 are executed.

As described above, when it is determined any of the first electric motor torque Tg, the second electric motor torque Tm, and the output shaft torque Tp is positively/negatively reversed, the gear rattling noise can also be reduced by executing the slow change process when the output shaft torque Tp passes through zero.

Fourth Embodiment

Figure 13:
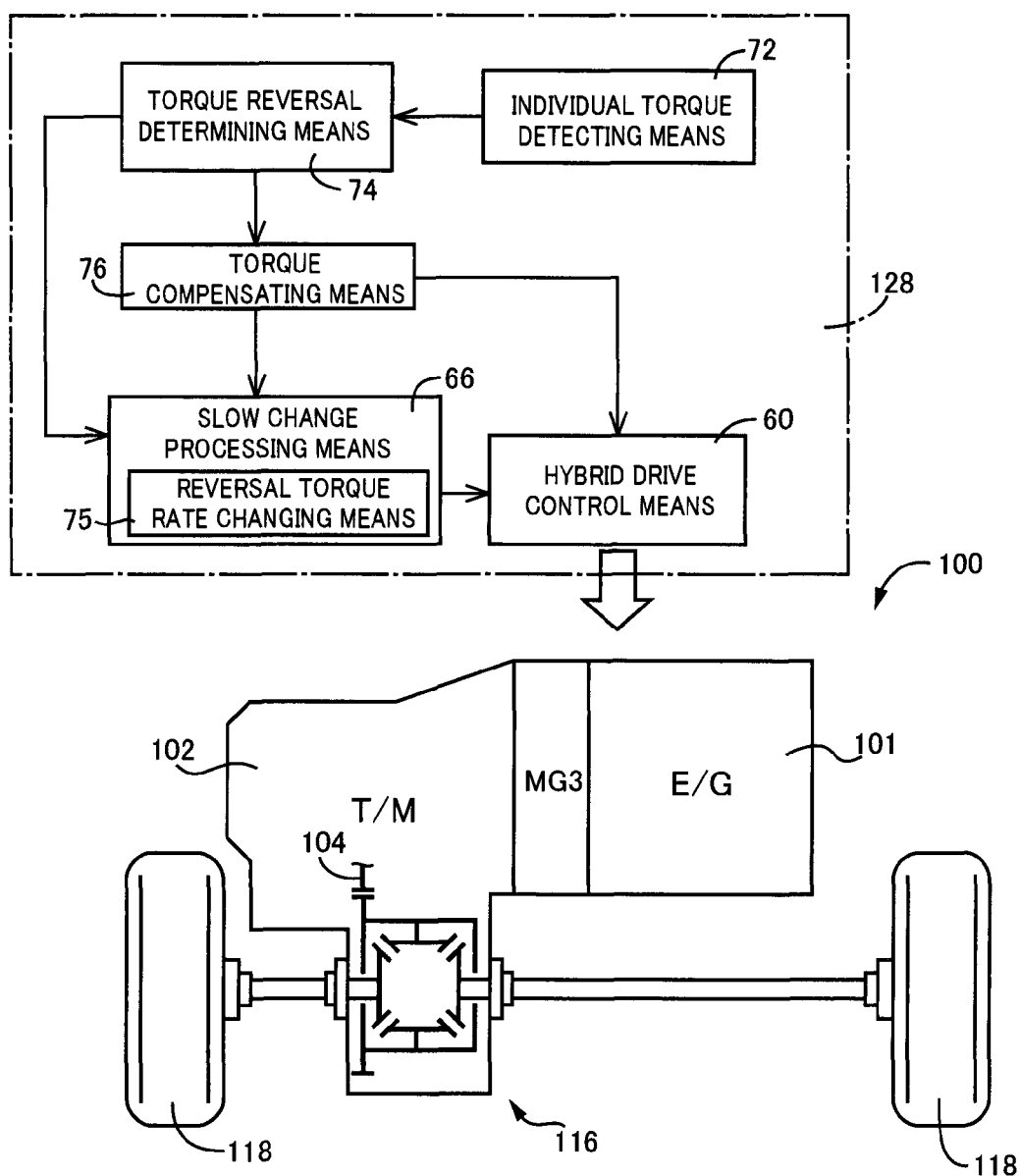
FIG. 13 is a diagram of a general configuration (schematic) for explaining a configuration of a hybrid drive device that is another embodiment of the present invention.

FIG. 13 is a schematic for explaining a configuration of a hybrid vehicle power transmission device 100 (hereinafter referred to as the power transmission device 100) that is another embodiment of the present invention. The power transmission device 100 has a single electric motor MG3 (corresponding to the electric motor of the present invention) coupled directly or via a clutch device not depicted to a crankshaft of an engine 101 (corresponding to the prime mover of the present invention). An automatic transmission 102 is coupled via the electric motor MG3 directly or via a clutch device not depicted to the engine 101. An output gear 104 (corresponding to the drive shaft of the present invention) of the automatic transmission 102 is coupled directly or via a clutch device not depicted to a differential gear device 116 in a power transmittable manner. The power of the differential gear device 116 is configured to be transmitted to a pair of left and right drive wheels 118. The engine 101 can reduce the rotation resistance of the engine 101 by closing an intake valve, for example, and can effectively provide regenerative control by reducing the rotation resistance of the engine 101 during regeneration of the electric motor MG3.

For example, during low-load running, a vehicle of this embodiment is driven by the electric motor MG3 with the engine 101 stopped and, during high-load running, the vehicle is driven by the engine 101 and the drive force of the engine 101 is assisted by driving the electric motor MG3 as needed. At the time of deacceleration, the electric motor MG3 is caused to act as a generator to convert kinetic energy into electric energy, which is accumulated.

Figure 14:
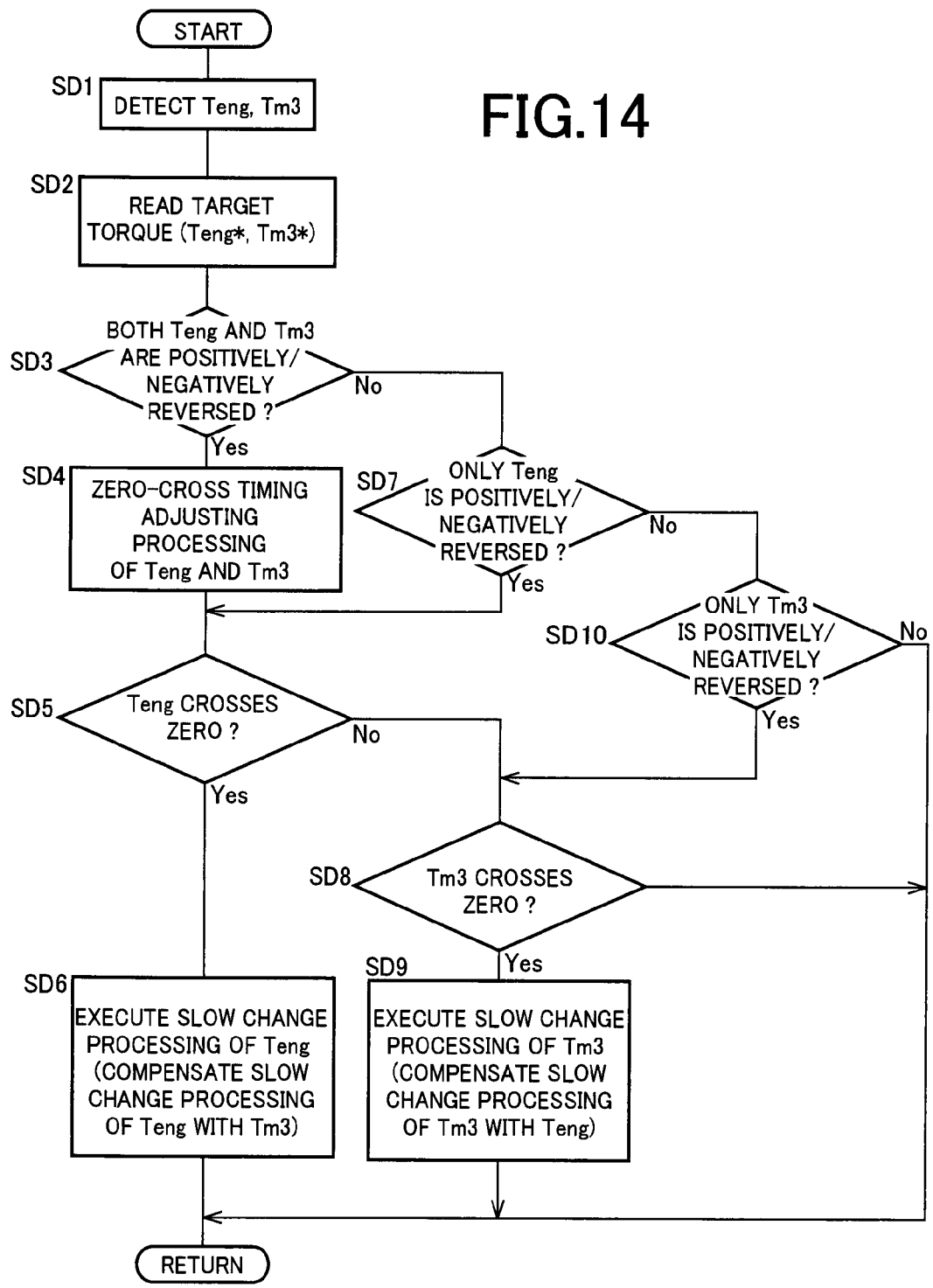
FIG. 14 is a flowchart for explaining a main portion of the control operation of the electronic control unit of the present invention, i.e., the control operation of suppressing the gear rattling noise generated when at least one of the engine torque and the third electric motor torque of the third electric motor is positively/negatively reversed.

The present invention is applicable to the power transmission apparatus 100 configured as described above. The functions of an electronic control unit 128 are substantially the same as the embodiment and will not be described. The operation will hereinafter be described based on a flowchart depicted in FIG. 14. FIG. 14 is a flowchart explaining a main portion of the control operation of the electronic control unit 128 of the present invention, i.e., the control operation of suppressing the gear rattling noise generated when at least one of the engine torque Teng and the electric motor torque Tm (corresponding to a torque of the electric motor of the present invention) of the electric motor MG3 is positively/negatively reversed.

In FIG. 14, at step SD1 (hereinafter, step will be omitted) corresponding to the individual torque detecting means 72, the engine torque Teng and the electric motor torque Tm3 of the electric motor MG3 are detected. At SD2 corresponding to the hybrid drive control means 60, the target engine torque Teng* of the engine torque Teng and the target electric motor torque Tm3* of the electric motor torque Tm3 are read. At SD3 corresponding to the torque reversal determining means 74, it is determined whether both the engine torque Teng and the electric motor torque Tm3 are positively/negatively reversed. If SD3 is affirmative, the timings of passage of the engine torque Teng and the electric motor torque Tm3 through zero is adjusted at SD4 corresponding to the slow change processing means 66 and the torque rate changing means 75. Specifically, the timing is adjusted such that the timing of passage of the engine torque Teng through zero does not overlap the timing of passage of the electric motor torque Tm3 through zero. Which of the engine torque Teng and the electric motor torque Tm3 is first subjected to the slow change process is determined based on the responsiveness of the output shaft torque Tp, for example. At SD5 corresponding to the individual torque detecting means 72, the engine torque Teng is detected and it is determined whether the engine torque Teng is in the state of passing through zero. If SD5 is affirmative, at SD6 corresponding to the slow change processing means 66, the torque rate changing means 75, and the torque compensating means 76, the torque rate α at the time of passage of the engine torque Teng through zero is changed to a preset value capable of suppressing the gear rattling noise and the slow change process of the engine torque Teng is executed based on the torque rate α. The engine torque Teng is executed through the opening/closing control of the electronic throttle valve, the control of a fuel injection amount, and the control of ignition timing, for example. The torque compensation with the electric motor torque Tm3 is correspondingly performed.

On the other hand, if SD5 is negative, it is determined whether the electric motor torque Tm3 is in the state of passing through zero at SD8 corresponding to the individual torque detecting means 72. If SD8 is affirmative, at SD9 corresponding to the slow change processing means 66, the torque rate changing means 75, and the torque compensating means 76, the torque rate α of the electric motor torque Tm3 is changed to a preset value capable of suppressing the gear rattling noise and the slow change process of the electric motor torque Tm3 is executed based on the torque rate α. The torque compensation with the engine torque Teng is correspondingly performed. On the other hand, if SD8 is negative, this routine is terminated.

Returning to SD3, if SD3 is negative, it is determined whether the engine torque Teng is positively/negatively reversed at SD7 corresponding to the torque reversal determining means 74. If SD7 is affirmative, this routine goes to SD5 and steps after SD5 are executed. If SD7 is negative, it is determined whether the electric motor torque Tm3 is positively/negatively reversed at SD10 by the torque reversal determining means 74. If SD10 is affirmative, this routine goes to SD8 and steps after SD8 are executed. On the other hand, if SD10 is negative, this routine is terminated.

Figure 15:
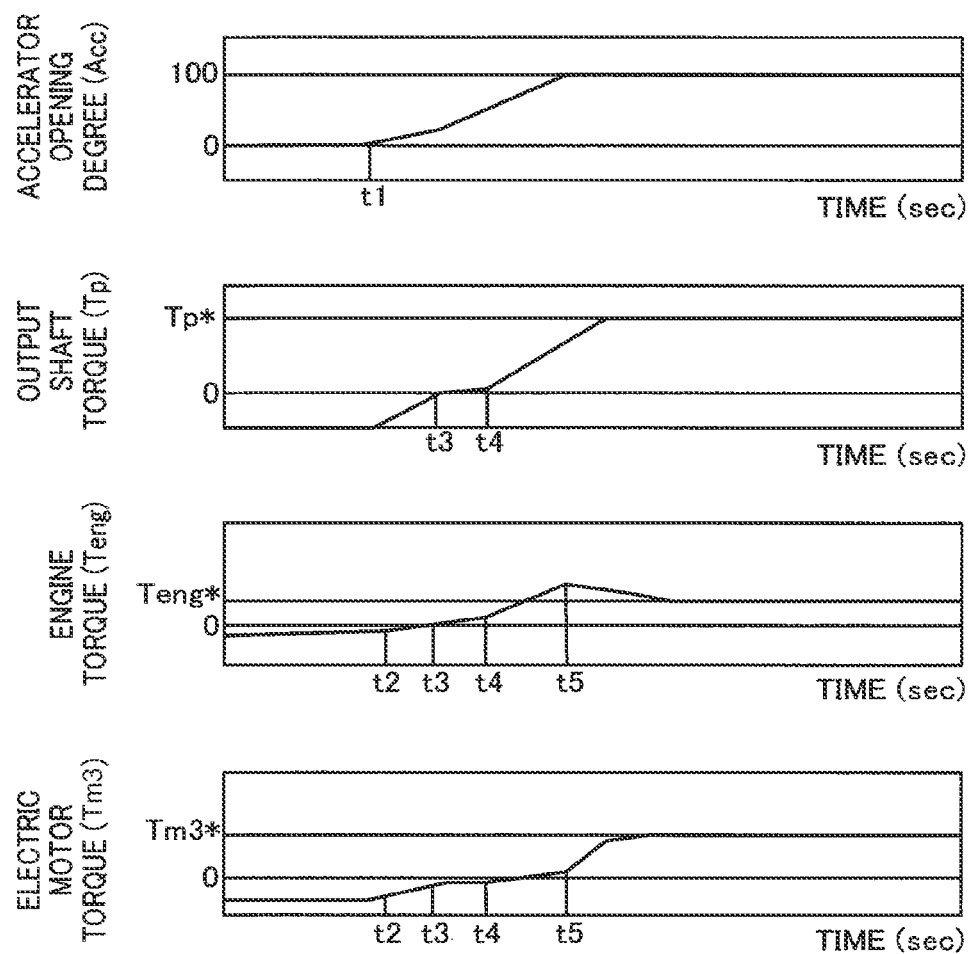
FIG. 15 is a time chart of an example of operation when the slow change processing means is executed in the case of the positive/negative reversal of both the engine torque of the engine and the third electric motor torque.

FIG. 15 is a time chart of an example of operation when the slow change processing means 66 is executed in the case of the positive/negative reversal of both the engine torque Teng of the engine 101 and the electric motor torque Tm3, for example. FIG. 15 corresponds to such a case that acceleration running is performed by pressing down an accelerator pedal from deacceleration running with a brake pedal pressed down, for example.

In FIG. 15, when the accelerator pedal 27 is pressed down at time point t1, the requested output shaft torque Tp* of the output gear 104 is calculated based on the accelerator pedal Acc, the vehicle speed V, the gear ratio of the automatic transmission 102, etc., and the target engine torque Teng* of the engine 101 and the target electric motor torque Tm3* of the electric motor MG3 are calculated for outputting the requested output shaft torque Tp*. The torque reversal determining means 74 then determines that the engine torque Teng and the electric motor torque Tm3 are positively/negatively reversed. In this case, the slow change processing means 66 and the torque rate changing means 75 adjust the timings (such as order) of the passage of the engine torque Teng and the electric motor torque Tm3 through zero. In FIG. 15, first, the slow change process of the engine torque Teng is executed from time point t2 to time point t3. Here, the electric motor torque Tm3 is output so as to compensate the shortage of the output shaft torque Tp due to the slow change process of the engine torque Teng (from time point t2 to time point t3). The slow change process of the output shaft torque Tp is executed from time point t3 to time point t4 since the output shaft torque Tp passes through zero. The slow change process of the output shaft torque Tp is executed through the torque control of the engine torque Teng and the electric motor torque Tm3. From time point t4 to time point t5, the slow change process of the electric motor torque Tm3 is executed. Here, the engine torque Teng is output so as to compensate the shortage of the output shaft torque Tp due to the slow change process of the electric motor torque Tm3 (from time point t4 to time point t5).

Even the vehicle including the power transmission device 100 having the signal electric motor MG3 configured as described above can acquire the effect of enabling the suppression of the gear rattling noise generated when the engine torque Teng, the electric motor torque Tm3, and the output shaft torque Tp pass through zero by applying the slow change processing means 66 and the torque compensating means 76 as is the case with the embodiment described above.

Although the embodiments of the present invention have been described in detail with reference to the drawings, the present invention is applied in other forms.

For example, although the slow change processing means 66 and the torque compensating means 76 are applied to the power transmission device 10 including the engine 24, the planetary gear device 26, the first electric motor MG1, and the second electric motor MG2, and the power transmission device 100 including the engine 24, the electric motor MG3, and the automatic transmission 102 in the embodiments, the present invention is not limited to the hybrid drive device with the configuration and is applicable to other hybrid drive device. For example, the present invention is applicable to a configuration with an automatic transmission mounted on a subsequent stage portion of the above-described power transmission device 10 and a configuration having a different coupling site of the planetary gear device 26. In other words, the present invention is appropriately applicable to any hybrid drive devices having various coupling configurations as long as the output torque is positively/negatively reversed depending on a running state of the vehicle.

Although the second electric motor MG2 is directly coupled to the output shaft 14 in the embodiments, the second electric motor MG2 may be coupled via a transmission, a clutch device, etc., to the output shaft 14 in a power transmittable manner.

Although, when the torque passing through zero is slowly changed, the torque rate α is a given preset value or a value changed depending on the absolute value of the torque in the embodiments, the torque rate α set at the time of passage of the torque through zero is not limited to these values. The torque rate α can be changed depending on another parameter (such as electric motor temperature) within a range of suppressing the gear rattling noise generated when the torque passes through zero, and can freely be changed within a range causing no contradiction.

Although the individual torque detecting means 72 detects actual torque based on a current value etc., of electric motors in the embodiments, the individual torque detecting means 72 may be implemented by replacing a detected value with a torque command value instead of actual torque.

Although the boundary value Tc and the torque rate α for the slow change process of the torques are set to the same values for the torques in FIG. 4 in the embodiment, the description is an example and the torque rate α may be changed in accordance with the first electric motor torque Tg, the second electric motor torque Tm, and the output shaft torque Tp. Although the boundary value Tc and the torque rate α of the torques are set to the same values regardless of whether the torques are positive or negative, the boundary value Tc and the torque rate α may be prescribed by separate values (two-dimensional maps) depending on whether the torques are in a positive area or a negative area. When the torque rate α changes depending on the absolute values of the torques, the torque rate α is set to change along a curved line; however, the description is an example and the torque rate α may linearly change.

The described embodiments are merely exemplary embodiments and the present invention may be implemented in variously modified and improved forms based on the knowledge of those skilled in the art.

DESCRIPTION OF REFERENCE NUMERALS 10, 100: hybrid type vehicle power transmission device (vehicle power transmission device)
14: output shaft (drive shaft)
24: engine
26: planetary gear device (differential mechanism)
36: crankshaft (input shaft)
66: slow change processing means
76: torque compensating means
101: engine (prime mover)
104: output gear (drive shaft)
MG1: first electric motor (prime mover)
MG2: second electric motor (electric motor)
MG3: electric motor
Tp: output shaft torque (torque of the drive shaft)
Tg: first electric motor torque (torque of the prime mover)
Tm: second electric motor torque (torque of the electric motor)

Teng: engine torque
Tm3: electric motor torque (torque of the electric motor)
α: torque rate

The invention claimed is:

1. A control device of a hybrid type vehicle power transmission device having a prime mover and an electric motor each coupled to a drive shaft in a power transmittable manner, comprising:
    a slow change processing means, when any of a torque of the prime mover and a torque of the electric motor changes and passes through zero, slowly changing the torque at a change rate set in advance for suppressing gear rattling noise; and
    a torque compensating means, if the slow change processing means slowly changes the torque of one of the prime mover and the electric motor, compensating a shortage of the torque of the drive shaft occurring due to the slow change with the other torque not slowly changed, wherein
    the prime mover is a first electric motor coupled in a power transmittable manner to a rotating element of a differential mechanism having an input shaft coupled to an engine, wherein
    the electric motor is a second electric motor coupled in the power transmittable manner to an output shaft of the differential mechanism, wherein
    the torque compensating means is implemented while the engine is in operation, wherein
    if it is determined that the torques of both the first electric motor and the second electric motor change and pass through zero during the torque control of the drive shaft, the slow change processing means makes an adjustment such that the timing of slowly changing the torque of the first electric motor does not overlap the timing of slowly changing the torque of the second electric motor.

2. The control device of the hybrid type vehicle power transmission device of claim 1, wherein the change rate of the torque at the time of execution of the slow change processing means is set based on a preset two-dimensional map configured with an absolute value of the torque and the change rate of the torque.

3. The control device of the hybrid type vehicle power transmission device of claim 1, wherein the change rate of the torque at the time of execution of the slow change processing means is a given preset value suppressing the gear rattling noise.

* * * * *